United States Patent [19]

Tazaki

[11] 4,415,911
[45] Nov. 15, 1983

[54] RECORDING APPARATUS

[75] Inventor: Shigemitsu Tazaki, Matsudo, Japan

[73] Assignee: Canon Kabushiki Kaisha, Tokyo, Japan

[21] Appl. No.: 403,014

[22] Filed: Jul. 29, 1982

Related U.S. Application Data

[63] Continuation of Ser. No. 154,906, May 30, 1980, abandoned.

[30] Foreign Application Priority Data

Jun. 8, 1979 [JP] Japan .................................. 54-72614

[51] Int. Cl.³ .......................................... G01D 15/24
[52] U.S. Cl. ................................ 346/140 R; 318/135; 400/322
[58] Field of Search ................... 346/139 R, 75, 140; 318/687, 135; 400/322, 126

[56] References Cited

U.S. PATENT DOCUMENTS

| | | | |
|---|---|---|---|
| 4,012,676 | 3/1977 | Giebler | 318/135 |
| 4,050,564 | 9/1977 | Carmichael | 346/75 X |
| 4,216,480 | 8/1980 | Buehner | 346/75 |
| 4,313,684 | 2/1982 | Tazaki | 346/140 R |

*Primary Examiner*—Joseph W. Hartary
*Attorney, Agent, or Firm*—Fitzpatrick, Cella, Harper & Scinto

[57] ABSTRACT

When reversing the advancing direction of a carriage having a printing head, speed control for the carriage is forbidden to enable high-speed recording and smooth movement of the carriage.

6 Claims, 23 Drawing Figures

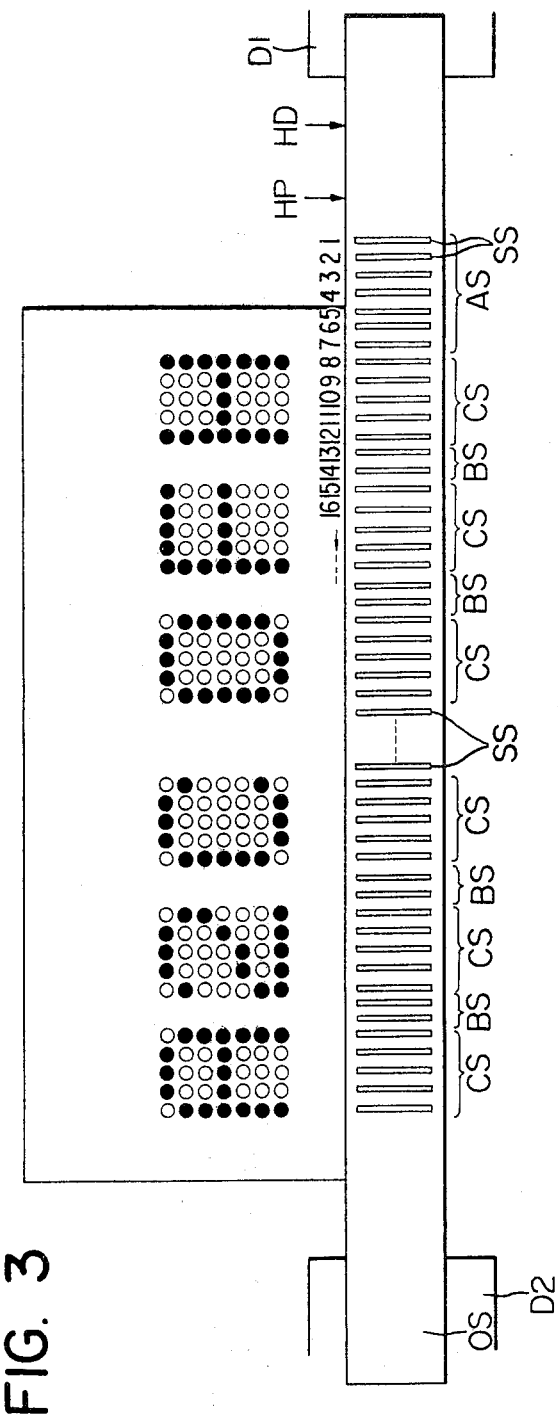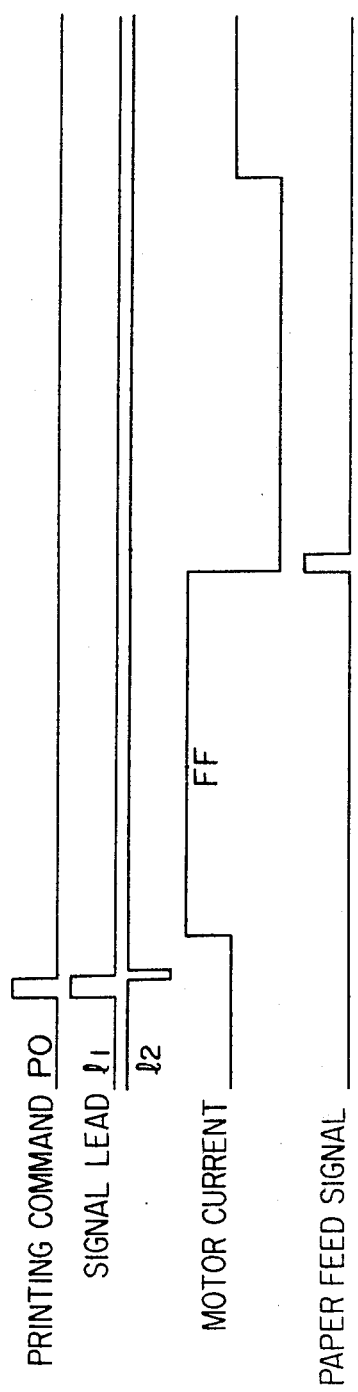

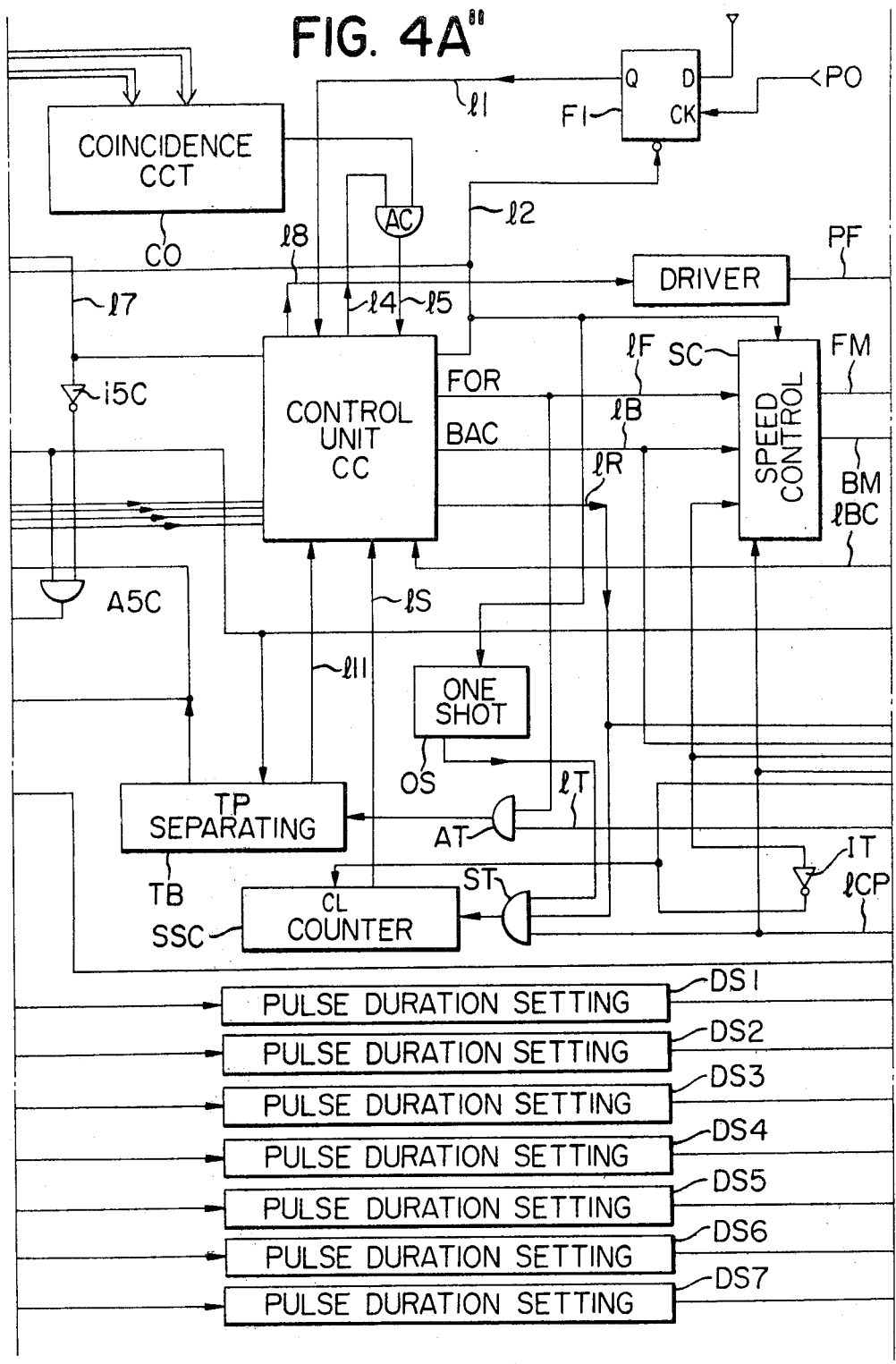

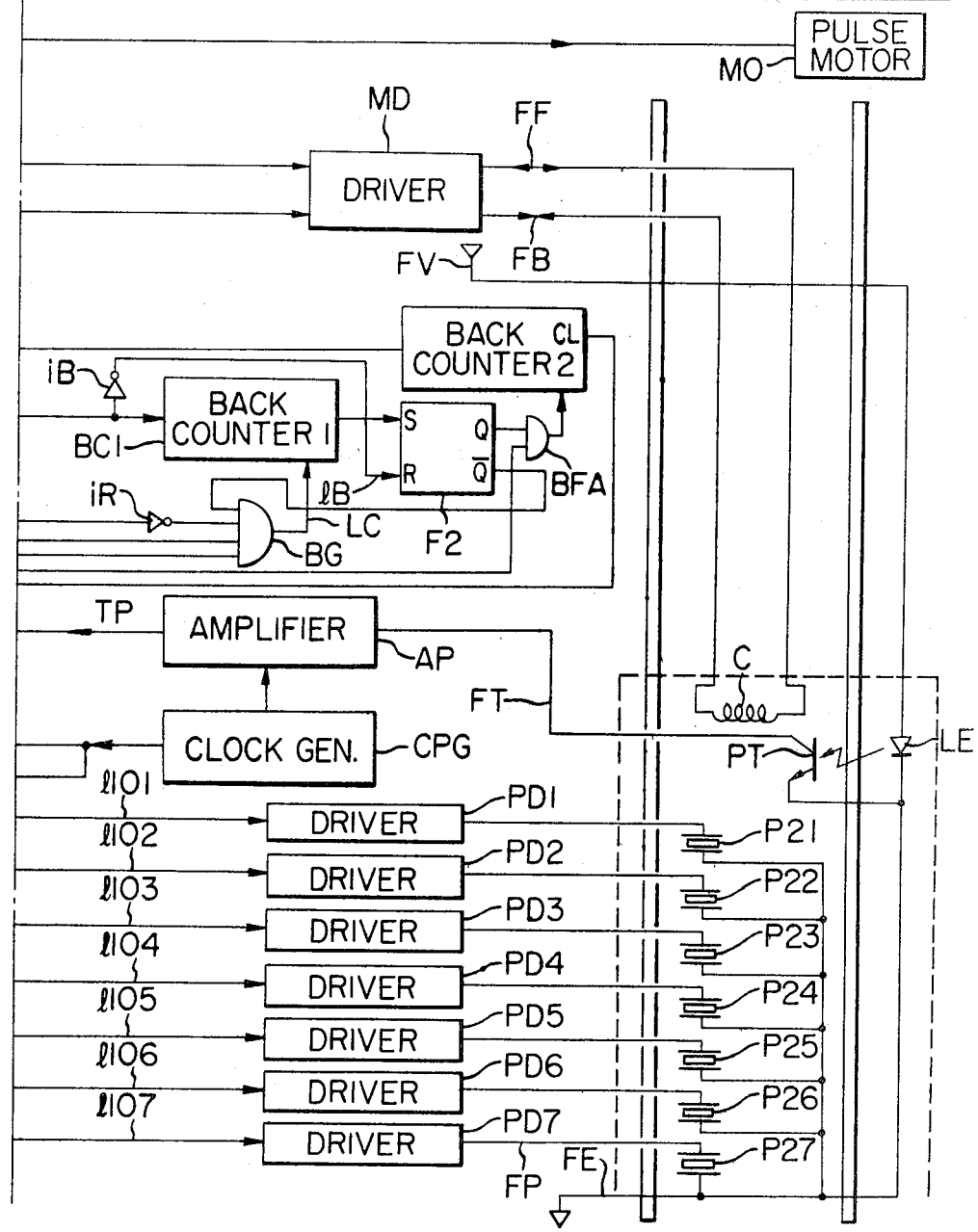

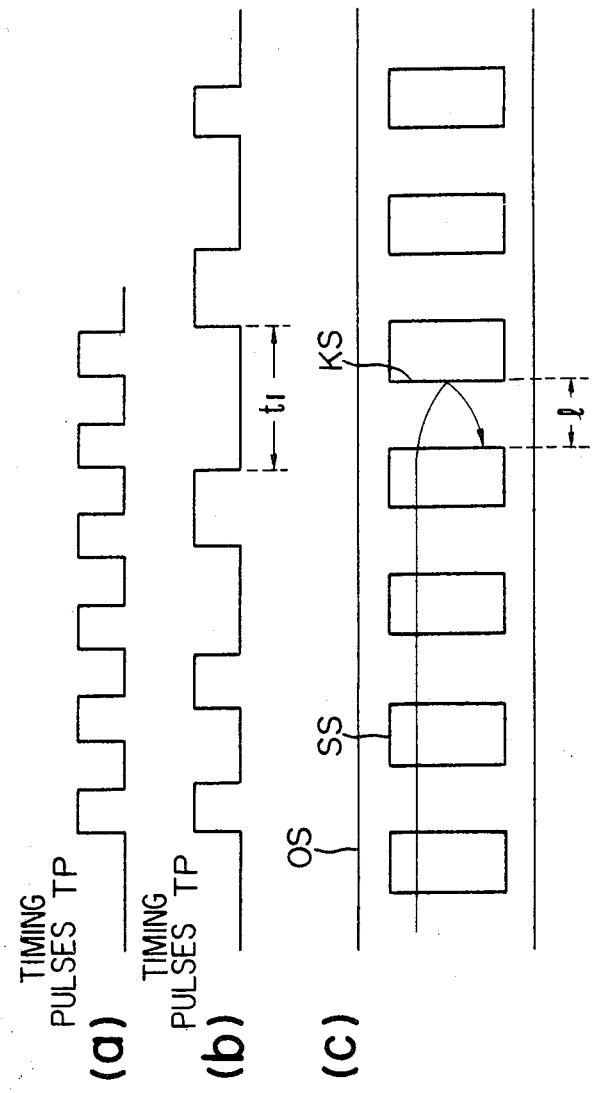

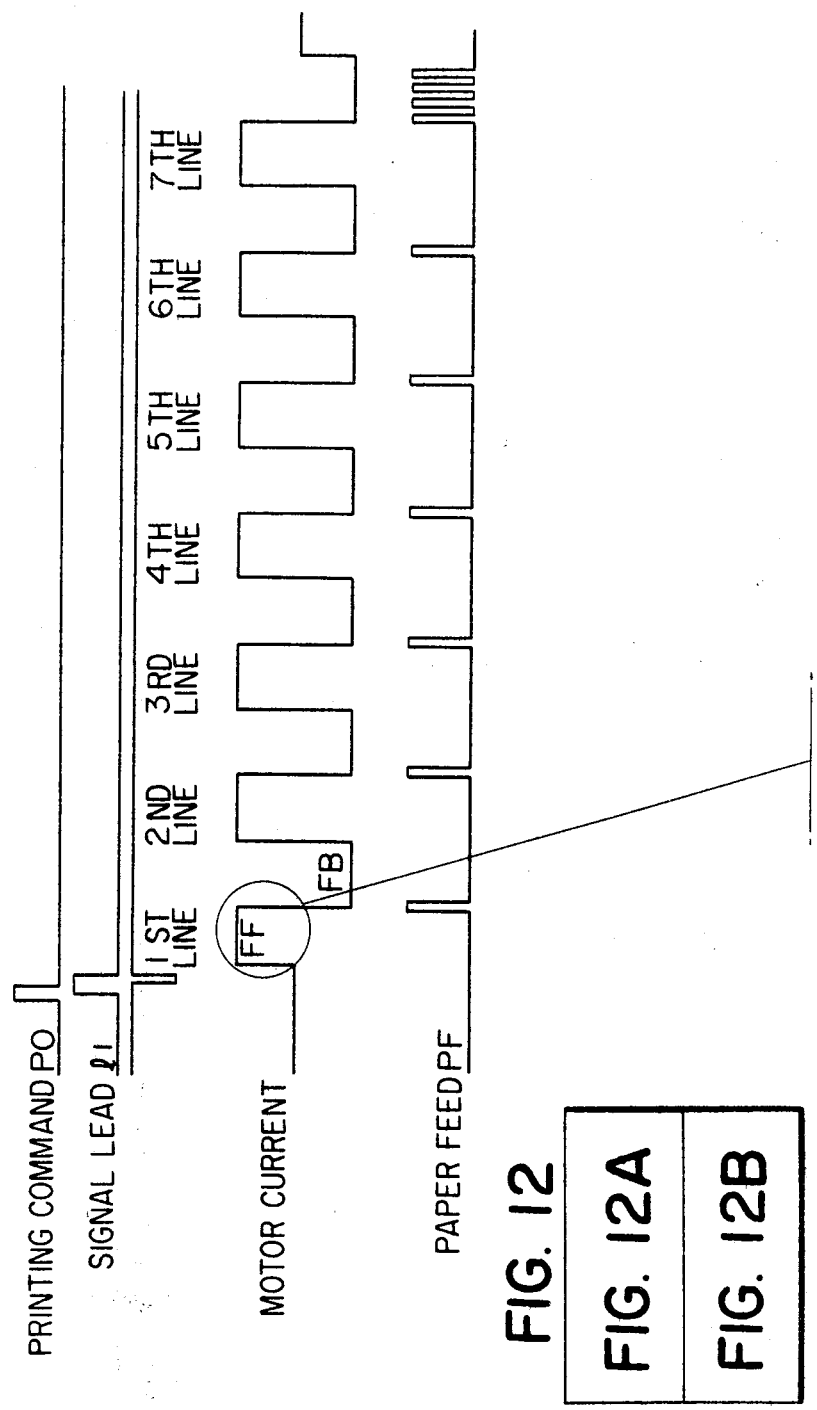

RECORDING APPARATUS

BACKGROUND OF THE INVENTION

This is a continuation, of application Ser. No. 154,906, filed May 30, 1980 now abandoned.

1. Field of the Invention

The present invention relates to a recording apparatus utilizing a linear motor, and more particularly to a recording apparatus and a linear motor control system allowing highspeed recording and smooth movement of the carriage.

2. Description of the Prior Art

The conventional apparatus of this sort are generally larger in size with complicated mechanism, and are unable to achieve smooth reversing of the advancing direction of the carriage.

An object of the present invention is to resolve the technical difficulties associated with the prior technology and to provide an improvement thereon.

BRIEF DESCRIPTION OF THE DRAWINGS

FIG. 3 is a magnified view of the graduation plate;

FIG. 4B shows the control timing for the control section of FIG. 4A;

FIG. 6A and 6B are waveform charts showing the recording operations;

FIGS. 12, 12A and 12B are waveform charts showing the operations of the embodiment.

DESCRIPTION OF THE PREFERRED EMBODIMENTS

Figure 1:
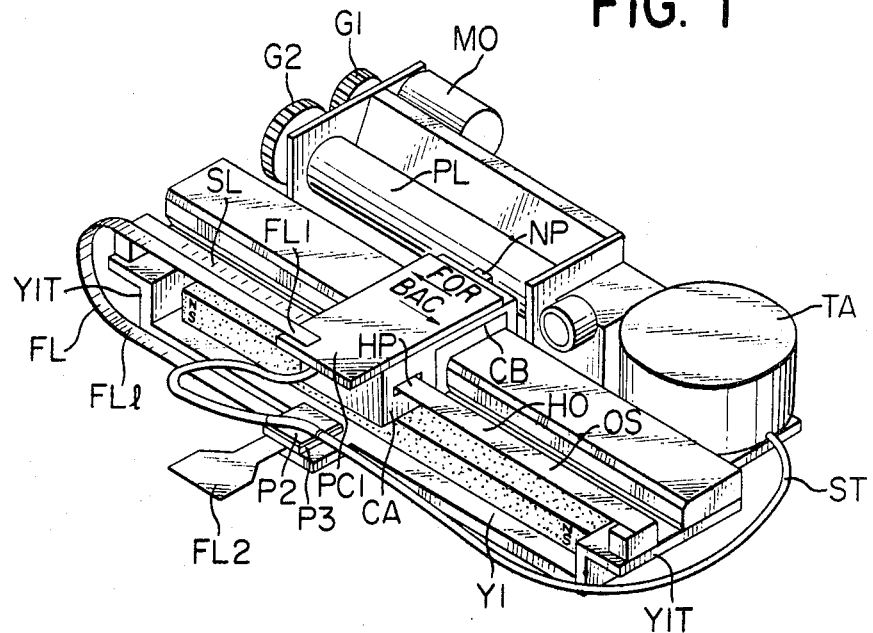
FIG. 1 is a perspective view of an embodiment of recording apparatus in accordance with the present invention.
Figure 2:
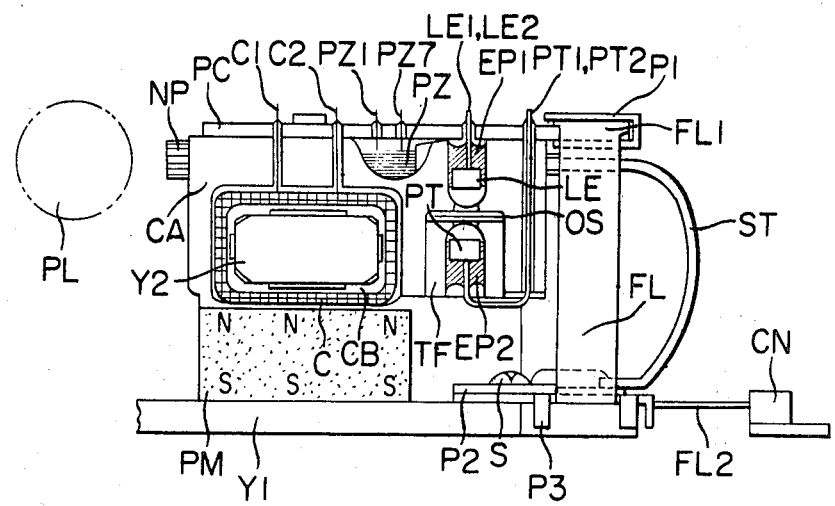
FIG. 2 is a cross-sectional view of the apparatus shown in FIG. 1.

The recording apparatus in accordance with the present invention is now discussed in detail with respect to an embodiment thereof shown in FIG. 1, and FIG. 2 showing the cross-sectional view thereof, in which a carriage CA having a noiseless recording head such as seven ink jet nozzles NP is driven by a linear motor.

The linear motor is provided with a closed magnetic circuit composed of a permanent magnet PM, a magnetic plate Y1 and a magnetic guide member Y2. Electric current is supplied to a coil winding C wound on a coil bobbin CB slidably fitted on guide member Y2 to drive, under the Fleming's left-hand law, the carriage CA which is formed integrally with coil bobbin CB. The reciprocating motion of the carriage on the guide member Y2 is achieved by inverting in direction the current supplied to the coil C. There is also provided a graduation plate, such as a non-magnetic optical slit plate OS, which is fixed at both ends thereof, together with the guide member Y2, to the folded end portions Y1T of magnetic plate Y1 in such a manner as to be parallel to the guide member Y2. The carriage CA is provided with the coil bobbin CB for coil C, an ink jet head having seven ink jet nozzles NP, slit detecting means such as a light-emitting diode LE and a phototransistor PT fixed with adhesive materials EP1, EP2, and a printed circuit board PC. On printed circuit board PC fixed mechanically and electrically are terminals C1, C2 of the coil C, terminals PZ1, PZ2, PZ3, PZ4, PZ5, PZ6 and PZ7 of the piezoelectric elements PZ for driving seven ink jet nozzles NP, terminals LE1, LE2 of the lightemitting diode LE, and terminals PT1, PT2 of phototransistor PT. These signal lines are connected, at a portion PC1 of the printed circuit board, to an end FL1 of a flexible cable FL, and the connecting portion is fixed by a fixing plate P1 shown in FIG. 2. The flexible cable is folded back in the center thereof and secured by a fixing plate P2 and a cable fixing plate P3 both fixed in position by a screw S, where an ink supply tube ST for supplying ink from a tank TA is also secured by fixing plate P2. The other end FL2 of flexible cable FL is connected to a connector CN shown in FIG. 2, whereby the carriage CA and the piezoelectric elements PZ for seven ink jet nozzles NP are controlled through the signal lines in flexible cable FL. The optical slit plate OS is positioned between the light-emitting diode LE and the phototransistor PT. Along with the advancement of the carriage, the infrared light emitted by the light-emitting diode LE turns on and off the phototransistor PT through the slits SL and a receiving slit (not shown) of the same dimension provided on phototransistor PT to generate timing pulses TP, which are utilized for detecting the speed and position of the carriage CA during its scanning motion and for controlling the carriage speed, ink jet nozzles and a paper advancing or feeding stepping motor MO. Characters in a print line are composed of dot matrices.

In operation, the carriage initiates the scanning motion in response to a print instruction signal. Signals are supplied to the piezoelectric elements PZ of the seven ink jet nozzles at determined positions detected by timing pulses TP to cause ink droplet to be emitted from the nozzles thereby achieving printing of a line on recording paper (not shown). Upon completion of the printing of one line, the paper advancing stepping motor MO is rotated by a pitch corresponding to the space between lines, and simultaneously the carriage CA is returned to a print start position HP or HO. The rotation of stepping motor MO is reduced through a motor shaft gear (not shown), a gear G1 and a final gear G2 which is fixed on the shaft of a platen PL to advance the paper by a determined amount in the vertical direction. After completion of the final printing, the seven ink jet nozzles NP are returned to the position HO of a cap KP which thus prevents the clogging, drying and meniscus retraction in the ink jet nozzles.

As explained in the foregoing, the apparatus of the present embodiment can be realized with a compact, thin and simple structure without disturbance in the magnetic field since the carriage guide member and the non-magnetic optical slit plate are arranged in parallel to the magnetic plate of the permanent magnet.

Also it is rendered possible to realize significantly quiet recording apparatus because absence of a rotary motor in the carriage drive eliminates the use of other transmissions such as gears, links, racks etc., and also because of absence of ratchets, plungers etc., in the paper advancing mechanism.

Also the sliding contact of the carriage with the optical slit plate eliminates the ink eventually deposited thereon, thus preventing the danger of failure in response of the detecting means composed of light-emitting and light-receiving devices.

Furthermore the use of the printed circuit board secured on the carriage and connected to various electric elements permits easy and inexpensive manufacture, and the use of the flexible cable ensures free advancement and allows a simple structure since it is fixed at one point with the ink supply tube.

In the present embodiment the slit plate OS is provided with slits SS as shown in FIG. 3 for achieving positional control and a constant advancing speed.

The carriage speed is regulated before the counting of eight slits SS (the number being variable according to the carriage speed) after the carriage advancement is started from its start position HP or HO, and the printing of a character of the first printing position is initiated when the eighth slit is counted. The printing of the first position is completed over 5 slits (8th to 12th) while the succeeding 13th and 14th slits are left as a blank to the succeeding character, and the printing is thereafter repeated in this manner. AS, CS and BS respectively indicate approach slits for detecting the print start position, character slits and blank slits. These slits and the spaces therebetween serve to achieve a constant advancing speed of the carriage.

The apparatus of the present embodiment, utilizing seven ink jet nozzles, may be utilized in one-directional printing or in two-directional printing, but in the following discussion will be made on the operations of the one-directional printing.

The length of data to be printed is generally variable, and, in accordance with the present invention, the carriage CA is reciprocated according to the length of the data, thus reducing the time required for printing.

In the above-explained system in which the print position is sensed by a light detecting circuit mounted on the carriage CA driven by the linear motor in combination with an optical slit plate OS for achieving the printing operation under proper speed control, in the case where the carriage CA is returned to its home position without an order from the detecting means after the completion of the printing of characters of determined digits, the carriage CA is not immediately reversed to the backward direction after the drive current to the coil C is inverted but continues due to its inertia for a while to proceed in the forward direction, then temporarily stops and finally begins the backward advancement. Thus the amount of such inertia induced forward advancement is indeterminable, and the return to the home position through the counting of the slits becomes inapplicable in the case of the printing of a short line because the carriage reversing has to be made within the slitted area. For this reason there is required another method of control.

In the following there will be explained an embodiment of the control system including the directional reversing, while making reference to FIGS. 4A and 4B.

Figure 4A:
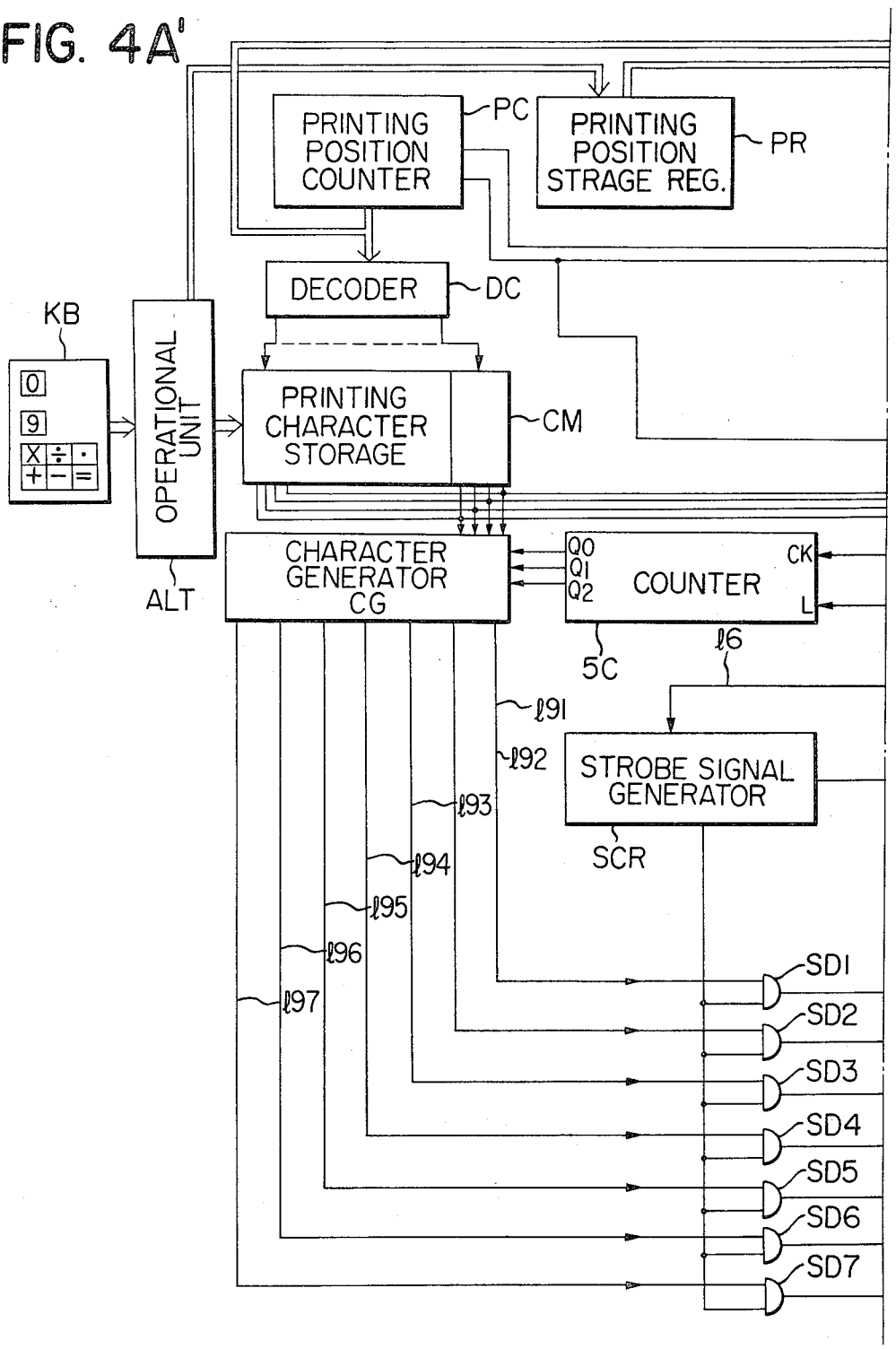
FIG. 4A, 4A', 4A'', 4''' are a schematic block diagram showing an example of the control section of the apparatus.

In response to the carriage CA advancing at a constant speed along the optical slit plate OS, the light detecting circuit composed of light-emitting diode LE and photo-transistor PT provides, through an amplifier AP shown in FIG. 4A on a signal line 1T, timing pulses TP of a waveform shown in FIG. 4B (a), and the position of the carriage CA during the advancement may be identified by counting those timing pulses. However, in case the carriage speed is not constant, particularly at the directional change, the pulse duration is not constant but undergoes a change as shown in FIG. 4B (b).

The speed v of the carriage CA of mass m moving under a force F is represented by the following equation:

$$m \cdot dv/dt = F - \eta v$$

where $\eta$ is a friction constant. Thus, assuming that the initial speed is equal to $v_o$ and substituting $m/v = \tau$ there is obtained:

$$v = v_o e^{-t/\tau} + F/\eta (1 - e^{-t/\tau})$$

The extension of the pulse duration resulting from the directional change becomes largest in the case where the carriage performs a reciprocating motion within an opaque (dark) portion on the optical slit plate as shown in FIG. 4B (c). The time required by such reciprocating motion ($t_1$ in FIG. 4B (b)) is represented by:

$$t_1 = 2\sqrt{2ml/F}$$

wherein l is the length of the opaque portion in the optical slit plate OS and the friction is negligible since the carriage speed is so small at the direction change.

On the other hand, according to the foregoing equations, the carriage may have a speed $F/\eta$ at maximum (called the end speed) at the arrival at its home position.

Thus it becomes possible to detect the arrival at the home position by comparing the pulse duration with a predetermined time period $t_1$ if an opaque portion at least of a length $F/\eta \times t_1$ or $2\sqrt{2mFl}/\eta$ is provided in the home position. Thus the present control system is featured in that the optical slit plate is provided with an opaque portion of a length at least of $2\sqrt{2mFl}/\eta$ at the home position area. In the case of reversing the carriage CA to the home position by corresponding current supply to the coil winding C after the completion of the printing of determined digits, the displacing distance of the carriage from the start of backward drive in the course of forward advancement at a constant speed to the temporary stop and the displacing distance of the carriage from such temporary stop to the achievement of backward drive at the constant speed are mutually equal if the friction is negligibly small and represented by $S = \frac{1}{2} \times m/F \times v^2$, where S is the distance, m is the mass, F is the force and v is the carriage speed. In practice, however, the decelerating distance from the start of backward drive to the temporary stop is shortened by the presence of the friction, while the accelerating distance from such temporary stop to the constant-speed backward drive is prolonged by the presence of the friction.

It is thus possible to calculate the number of slits to be detected from the start of the backward drive to the achievement of the constant-speed backward drive, by dividing the above-mentioned distances with the distance between the slits and adding a margin width. It is therefore also possible to detect the home position by comparing, after counting the slits of the above-mentioned number, the advancing time of the carriage in the opaque portion during the constant-speed backward advancement and the advancing time in the opaque portion in the home position area.

During the constant-speed advancement of the carriage CA, the advancing time in an opaque portion of a length l in the optical slit plate OS is given by e/v, so that the opaque portion in the home position area should give a longer advancing time than e/v for the purpose of that comparison. In practice that advancing time in the home position area is for example selected, with a safety margin, as long as 5 times of e/v.

This control system is advantageous in that the carriage drive is not interrupted even in case the carriage speed is decreased for example by a change in the friction because the control is performed through the counting of the slits, and provides a shorter detection time for home position detection since the time comparison is made with the advancing time of the distance l in the constant-speed advancement, thus enabling an increased printing speed.

For the purpose of such control the control circuit shown in FIG. 4A is provided with a backward counter 1 BC1, a flip-flop F2, a backward counter 2 BC2, gates BG, BFA and an inverter iR.

Now reference is made to FIG. 4A for explaining the control function of the present embodiment. In the illustrated circuit, the lines FF, FB, FV, FT, FP and FE are integrally structured as in a flexible cable FL shown in FIG. 1 for facilitating the movement of the carriage CA. Upon turning on of the power supply, a control unit CC maintains a signal line l2 at "0" level for a determined period to reset a flip-flop F1, to clear a print position counter PC, a timing pulse separating circuit TB and a backward counter BC1, to reset a flip-flop F2 through an inverter iB and to preset a counter 5C through a gate A5C, thereby activating a one-shot multivibrator OS, and further supplies a "1" level signal to a gate ST through a signal line lR.

Figure 5:
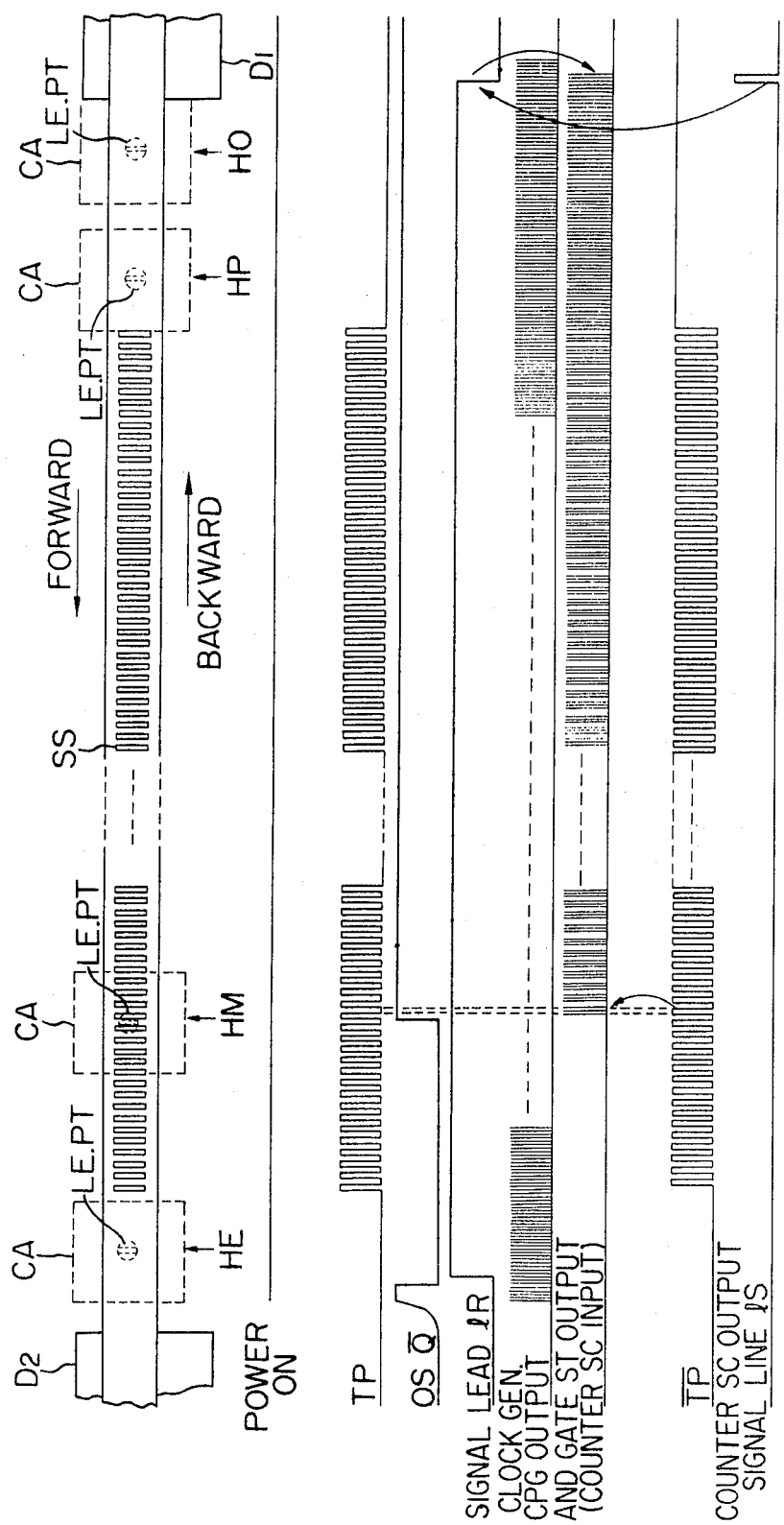
FIG. 5 is a view useful for understanding the direction reversing function.

Also in order to advance the carriage CA to the home position HO shown in FIG. 5, output signal lines lF, lB for driving the coil C are respectively maintained at the "0" level and "1" level thereby initiating the backward advancement of carriage CA.

The enabling period of time of one-shot multivibrator OS is so selected that the carriage CA can be moved for example to a position HM shown in FIG. 5 even if it is initially positioned at the left end. Stated differently this enabling time allows the carriage to arrive at a certain speed in order to prevent erroneous identification of the home position which may occur in case the carriage is positioned in an opaque portion of the slit plate OS with an initial low speed.

In response to the aforementioned coil drive in case the carriage is for example located at a position HE shown in FIG. 5, the light transmitted through the slits SL provides, through the amplifier AP shown in FIG. 4A, timing pulses TP on a signal line lT. Those pulses are supplied, after inversion into signals $\overline{TP}$ by an inverter iT, to the clear terminal of a counter SSC. Also the pulses from a clock generator CPG are not supplied to the counter SSC during the enabling time of the one-shot multivibrator OS since the gate ST is disabled during the enabling time.

At the same time the carriage moves from the position HE to the position HM and reaches a constant speed, and, after the enabling time period of the one-shot multivibrator OS, the counter SSC receives the output pulses from clock generator CPG only while the signal $\overline{TP}$ is at its "1" level (corresponding to an opaque portion on the slip plate) but is cleared when the signal $\overline{TP}$ assumes its "0" level.

Thus the counter SSC provides no output signal since it is cleared at the shift of signal $\overline{TP}$ to its "0" level state in response to the passage of the carriage CA over a slit SS on the slit plate OS. Also the counting capacity of counter SSC is selected sufficiently larger than the number of pulses received from the generator CPG during the passage of an opaque portion or during the advancement of the carriage to the home position HO, so that counter SSC completes the counting operation at a determined time after the arrival of the carriage at the home position HO, thus developing a signal over a signal line lS. In response thereto, the control unit CC identifies the arrival of the carriage CA at its home position, and shifting signal lines lB, lR thus terminating the carriage drive and closing the gate ST. Thus a gate BG starts to receive a "1" level signal through the inverter lR. D1 and D2 shown in FIG. 5 designate damping members for example composed of a foamed material for absorbing the collision impact and noise of the carriage.

Now in the following there will be explained the normal printing operation. Information to be printed is supplied from a keyboard KB and through an operational unit ALT and stored in a print character storage CM and a print position storage register PR. In response to a print command signal PO shown in FIG. 6A, the flip-flop F1 is set to shift the control unit CC to the print operation mode through a signal line l1, wherein the control unit CC maintains the signal line l2 at "0" level for a determined period to reset the flip-flop F1, to clear the print position counter PC, backward counter BC1 and timing pulse separating circuit TB, to reset the flip-flop F2 through the inverter iB and to preset the counter 5C through the gate A5C.

At the same time the one-shot multivibrator OS is also activated, but the counter SC is not affected since the gate ST is disabled in response to the "0" level state of the signal line lR. Also a gate BG is enabled through the inverter iR, but the backward counter BC1 does not function because of the conditions lB=0 and TP=0. After the abovementioned resetting and clearing operations, the control unit CC shifts a signal line l4 to "1" level to enable a gate AC, and detects, through a signal line l5, the output signal of a coincidence circuit CO identifying coincidence of the contents of the print position counter PC with those of a print position register PR. In the case of no coincidence the control unit CC maintains the signal lines lF and lB respectively at "1" and "0" to energize the coil C through a driver circuit MD thereby causing forward advancement of the carriage CA.

For example if the print position counter PC and the print position register PR respectively have contents "0" and "n", the coincidence circuit CO produces a signal indicating no coincidence, in response to which the control unit CC performs the above-explained operations.

Figure 6B:
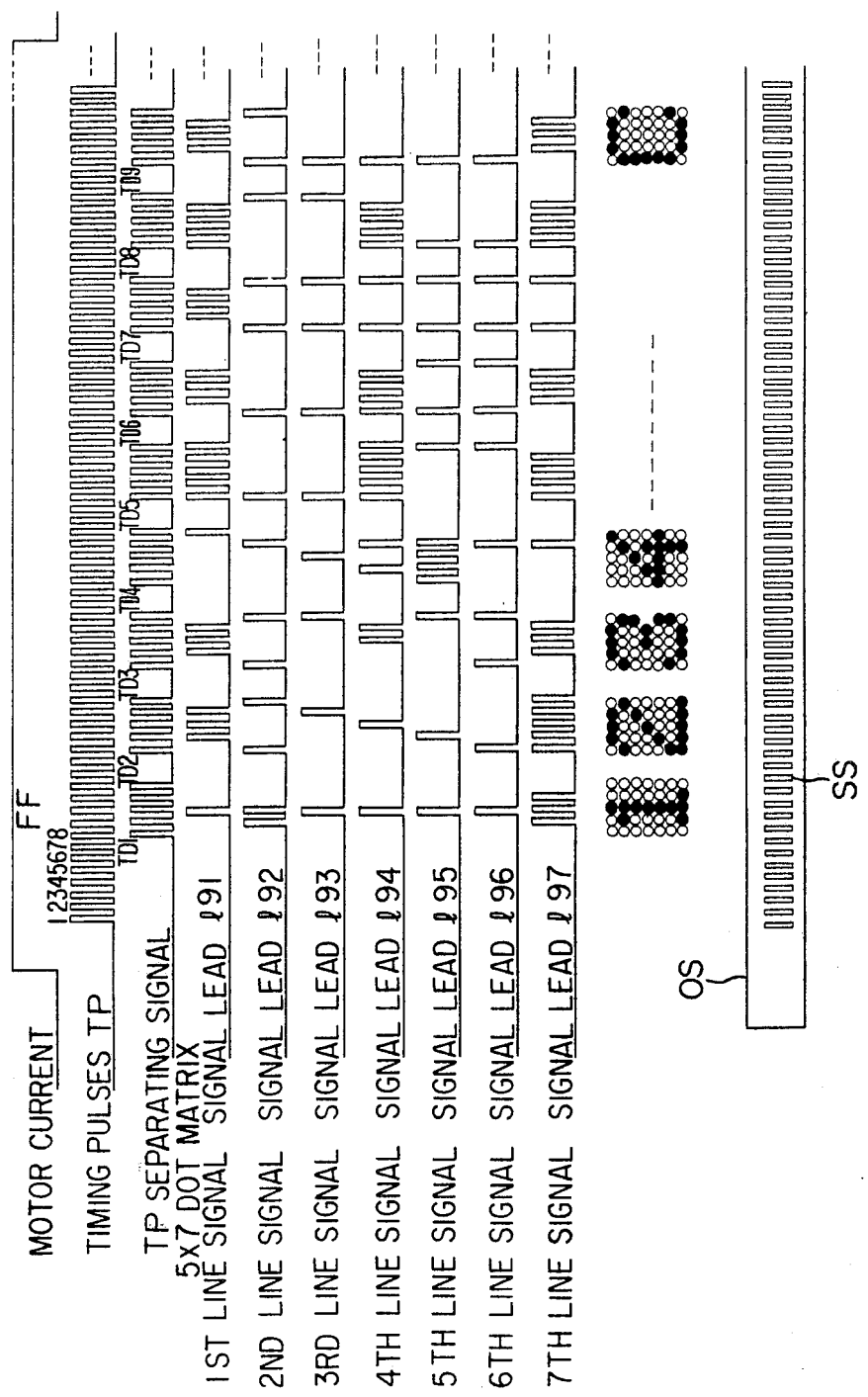

As the result of forward movement of the carriage CA the detecting unit LE, PT moves along the optical slit plate OS to generate timing pulses TP amplified by the amplifier AP. Those timing pulses are transmitted through a gate AT enabled under the condition lF=1, then separated by the timing pulse separating circuit TB into 5-pulse signal groups TD1-TDn for the printing of each character as shown in FIG. 6B, and supplied over a signal line 16 to a counter 5C from which they are further supplied to a character generator CG.

The number of printing positions involved in a line is previously stored in the print position register PR, while the positions of characters printed are counted by the print position counter PC of which output signal is supplied to a decoder DC for selecting the content of the print character storage CM.

In response to thus selected content and also to the control by the counter 5C, a character generator CG produces print signals constituting 7 dots in each column in the form of a 5×7 dot matrix.

Figure 7:
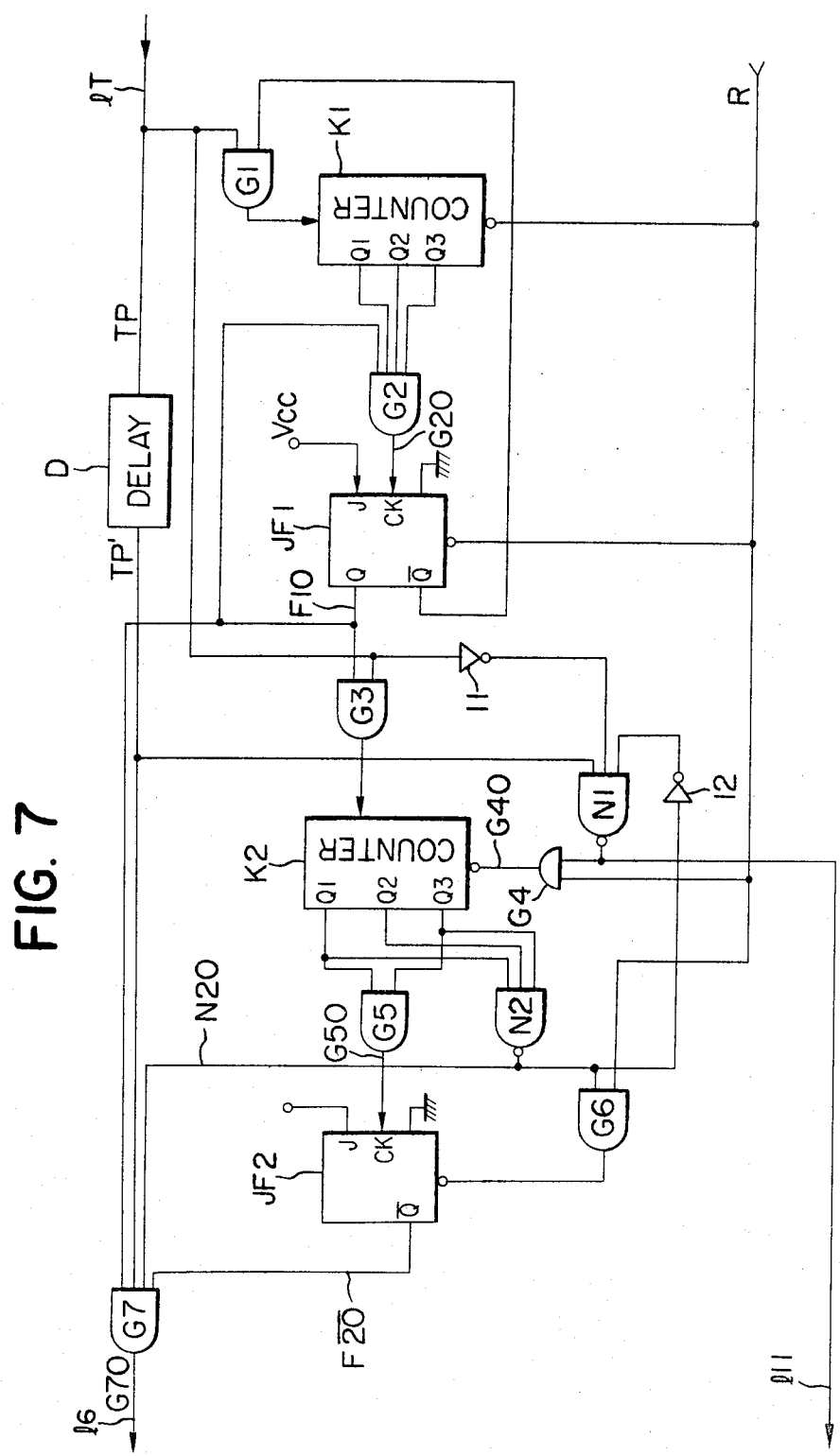
FIG. 7 is a circuit diagram showing a part of the circuitry shown in FIG. 4A.
Figure 8:
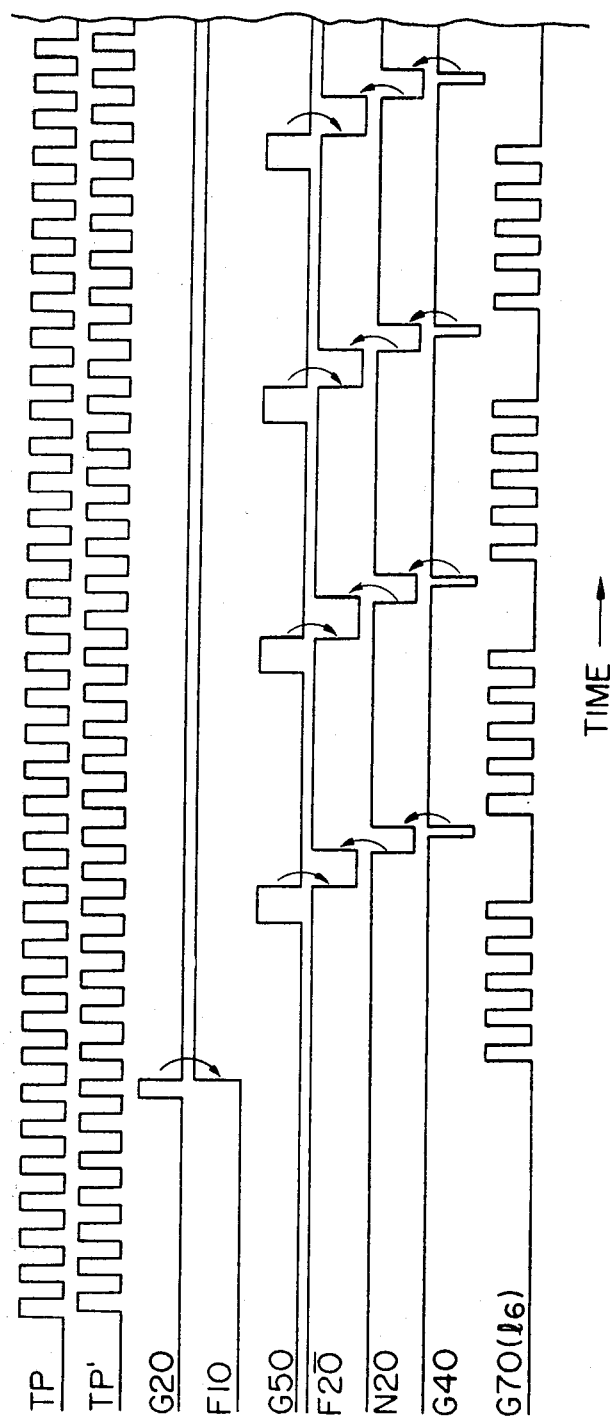
FIG. 8 depicts waveforms showing the operation of the circuitry of FIG 7.

Thus, when the first pulse of the 5-pulse group is developed from the timing pulse separating circuit TB in response to the timing pulses TP generated during the forward advancement of the carriage, the counter 5C is incremented, and the character generator CG supplies 7-dot print signals of the first column to gates SD1-SD7 through signals lines l91-l97. Gates SD1-SD7 are enabled by a strobe signal released from a strobe signal generators SCR in response to the high-level state of the 5-pulse signal group, whereby those print signals are supplied to pulse duration setting circuit DS1-DS7 to drive piezo drivers PD1-PD7 with pulses of a determined duration through output lines l101-l107, thereby selectively activating piezoelectric devices PZ1-PZ7 and thus causing selective droplet emissions for printing. The timing pulse separating circuit TB shown in FIG. 4A is for example composed, as shown in FIG. 7, of a delay circuit D, counters K1, K2, JK type flip-flops JF1, JF2, AND gates G1-G7, NAND gates N1, N2, and inverters I1, I2, and generates signal groups TD1-TDn according to the timing chart shown in FIG. 8.

Upon completion of the printing of 7 dots constituting the first of five columns in the 5×7 dot matrix for a character of the first position in the print line, the counter 5C is incremented through the signal line 16 by the second pulse in the 5-pulse signal group, whereby the character generator produces 7-dot signals for the second column in the 5×7 dot matrix for performing the printing in the similar manner. Thereafter the counter 5C is similarly incremented by the third through fifth pulses to perform the printing of third through fifth columns in the 5×7 dot matrix, thus completing the printing of a character of the first position. The control unit CC detects the completion of the printing of the first position through a signal line l11 and develops a signal on a line 17 to increment the print counter PC and to preset the counter 5C to its initial state through the inverter i5C. The coincidence circuit CO again compares the contents of the print counter PC with those of the print register PR as explained in the foregoing, and produces signals representative of the result of the comparison over the signal line 15 through the gate AC enabled by the line 14. In case the control unit CC identifies the absence of such coincidence, a character of the print character storage CM corresponding to the incremented count of the print counter PC is printed in response to the 5-pulse signal group TD2 supplied from the timing pulse separating circuit TB to the line 16.

The above-mentioned operations of the increment of the position counter, memory readout and input to the character generator CG can be sufficiently completed prior to the entry of succeeding 5-pulse signals into the counter 5C as the clock rate of the circuit is sufficiently higher than the frequency of timing pulses. In this manner the 7-dot printing of 5 columns in each printing position in a print line is conducted in response to the signals TD3, TD4, . . . , TDn. When the coincidence circuit CO identifies the coincidence of the contents of the print counter PC with those of the print register PR, the control unit CC receives the coincidence signal through the line 15 and the gate AC enabled by the signal on line 14 and thus detects the completion of the printing of a line.

In this situation the control unit CC identifies the state of the output signal line 11 of the flip-flop F1 indicating the presence or absence of succeeding print command signals. In the case of the "1" level state indicating the presence of the print command signal for the succeeding line, the control unit CC identifies the continued printing operation and shifts the signal lines 1F and 1B respectively to "0" and "1" to cause backward movement of the carriage. In this state the backward counter BC1 receives the timing pulses through a signal line 1C since the gate BG is enabled under the conditions 1R=0 inverted by the inverter iR and 1B=1. Thus, as explained in the foregoing, the counter BC1 counts timing pulses TP generated in response to the slits during the backward movement of the carriage. Simultaneously the control unit CC maintains a signal line 18 at "1" for a determined period to drive a paper feed driver PFD, thus effecting paper feed of several dot lines for obtaining a proper line-to-line spacing. Under completion of the counting of timing pulses, the backward counter BC1 sets the flip-flop F2 through the signal line 1B, whereupon a gate BFA is enabled to supply the output signals from the clock generator CPG to a backward counter 2 BC2. Counter 2 BC2 operates only in response to the high-level state of the signal $\overline{TP}$ supplied to the clear terminal thereof from the inverter iT, i.e. only when the carriage is located at a position corresponding to an opaque portion of the optical slit plate OS. This counter is of such full-count capacity, as explained in the foregoing, capable of distinguishing the advancement time in an opaque portion between slits SS from the advancement time in the opaque portion in the home position area which is for example selected 5 times as long as the former, and develops no output signal over a signal line 1BC in the slitted area since the counter is repeatedly cleared by the signal TP=0 generated by the slits, thus producing an output signal only in the home position area indicating the arrival of the carriage CA at the home position. In response to the signal the control unit CC identifies that the carriage has moved out from the slit area and shifts the line 1B to "0", thus terminating the backward carriage drive. Although the carriage CA continues inertial displacement thereafter, it is brought to a temporary stop by the forward drive for the succeeding printing operation to be discussed in the following, that temporary stop being at a position HP shown in FIG. 5. The printing operation is not effected during the backward carriage drive since the timing pulse separating circuit TB does not receive timing pulses TP as the gate AT is disabled under the condition 1F=0.

After the termination of the backward carriage drive, the control unit CC stores succeeding print line information into the print character storage CM and the number of characters in a succeeding line into the print position register PR to complete the preparation for the printing of the succeeding line, and maintains the signal line l2 at "0" level for a determined period as explained in the foregoing to reset the flip-flop F1, to clear the print counter PC, backward counter BC1 and timing pulse separating circuit TB, to reset the flip-flop F2 and to release the counter 5C to its initial state. The one-shot multivibrator OS is again activated but the counter SSC is not affected since the gate ST is disabled under the condition lR=0.

Then, in a similar manner as in the printing of the preceding line, the gate AC is enabled by the high-level state of the signal line l4, and the coincidence circuit CO compares the contents of the print counter PC with those of the print register PR and supplies the result of the comparison to the line l5 through gate AC. In the case of no coincidence the printing is effected in the above-explained manner, and, in the case of coincidence the completion of a print line is detected and the carriage is returned to its home position HP, in the case of further continued printing, for effecting the printing in a similar manner.

In case the control unit CC identifies the "0" level state of the output line l1 of the flip-flop F1 indicating the absence of succeeding print command signals, the carriage is returned to a stop position HO outside the printing slits by means of a procedure similar to that at the power turning-on.

The carriage stop position HP for continued printing is selected different from and in front of the stop position HO for non-continued printing, in order to reduce the printing time by curtailing the carriage advancing time outside the slit area and initiating the succeeding forward drive from stop position HP in the case of the continued printing.

It is also possible to always return the carriage to the stop position HP without using another stop position HO, but a separate stop position HO is useful for providing head protecting means KP for the fixation, capping and cleaning of the printing head or conducting the head recovery when the head is not in use. At the returning operation of the carriage CA to the position HO, the signal line l2 is maintained at "0" level for a determined period as in the turning on of the power supply to reset the flip-flop F1, to clear the print position counter PC, timing pulse separating circuit TB and backward counter BC1, to reset the flip-flop F2, and to preset the counter 5C to the initial state through the gate A5C. The one-shot multivibrator OS is activated to enable the gate ST through the signal line lR, whereby the output pulses from the clock pulse generator CPG are counted by the counter SSC only when TP=1. In this state the backward counter BC is not operative since the gate BG is disabled through the inverter iR.

Then the signal lines lF and lB are shifted respectively "0" and "1" to cause the backward carriage advancement by the coil C, during which the counter SSC repeats the counting of output pulses from generator CPG and the resetting according to the "1" and "0" of the timing pulse TP. After the arrival of the carriage at the position HO shown in FIG. 5, the counter SSC develops an output signal on the output line lS indicating the completion of determined pulse counting, whereupon the control unit CC identifies said arrival and shifts the signal line lB to "0" thus terminating the coil drive and stopping the carriage CA at position HO. Also the line lR is shifted to "0" to disable the gate ST and to enable the gate BG through the inverter BG. Also simultaneously with the backward carriage drive the control unit CC shifts the signal line l8 at "1" level for a determined period to effect paper feeding by the paper feed driver PFD, thus completing the printing operation.

Figure 9:
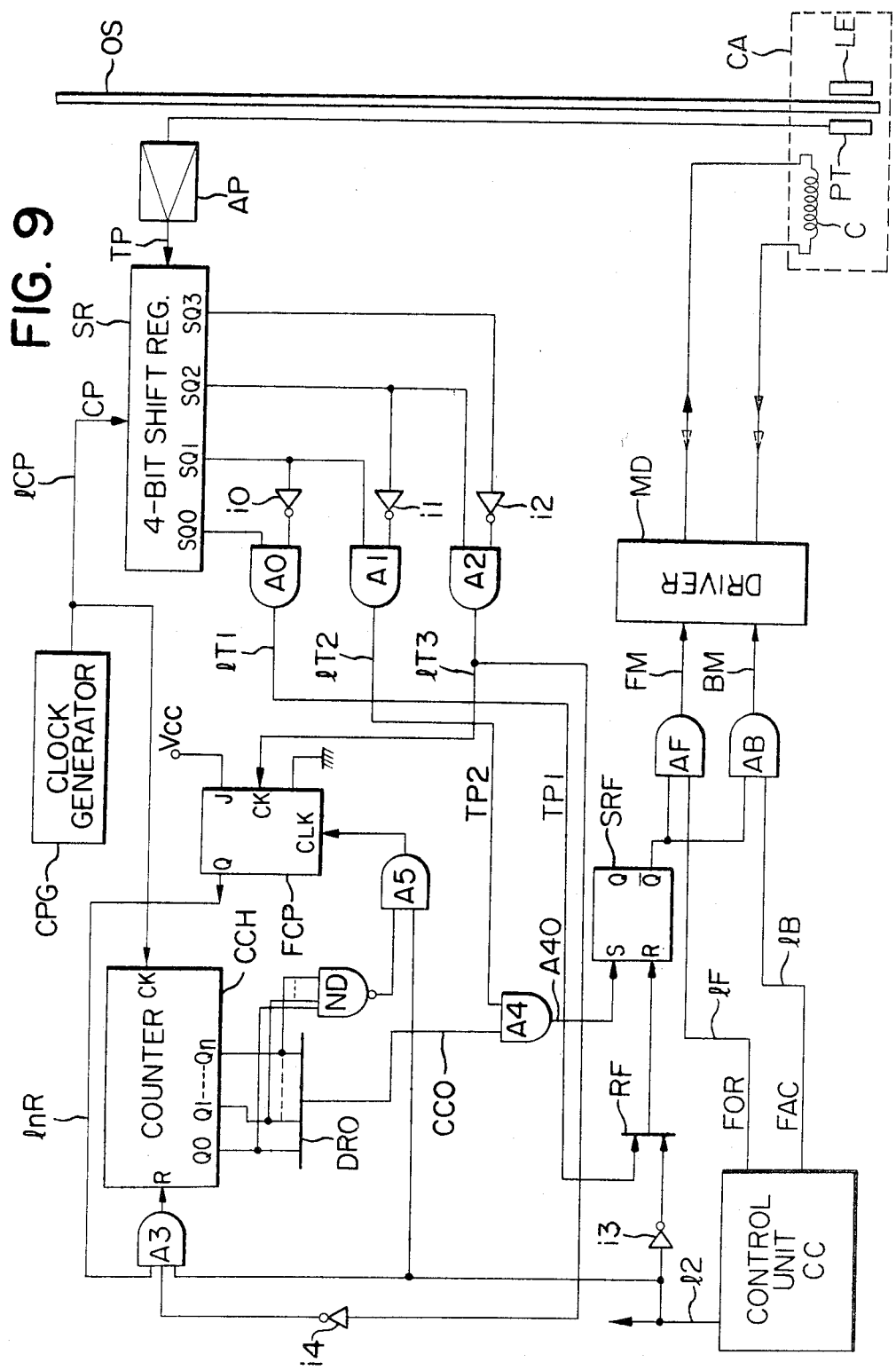
FIG. 9 is a circuit diagram of the speed control unit thereof.
Figure 10:
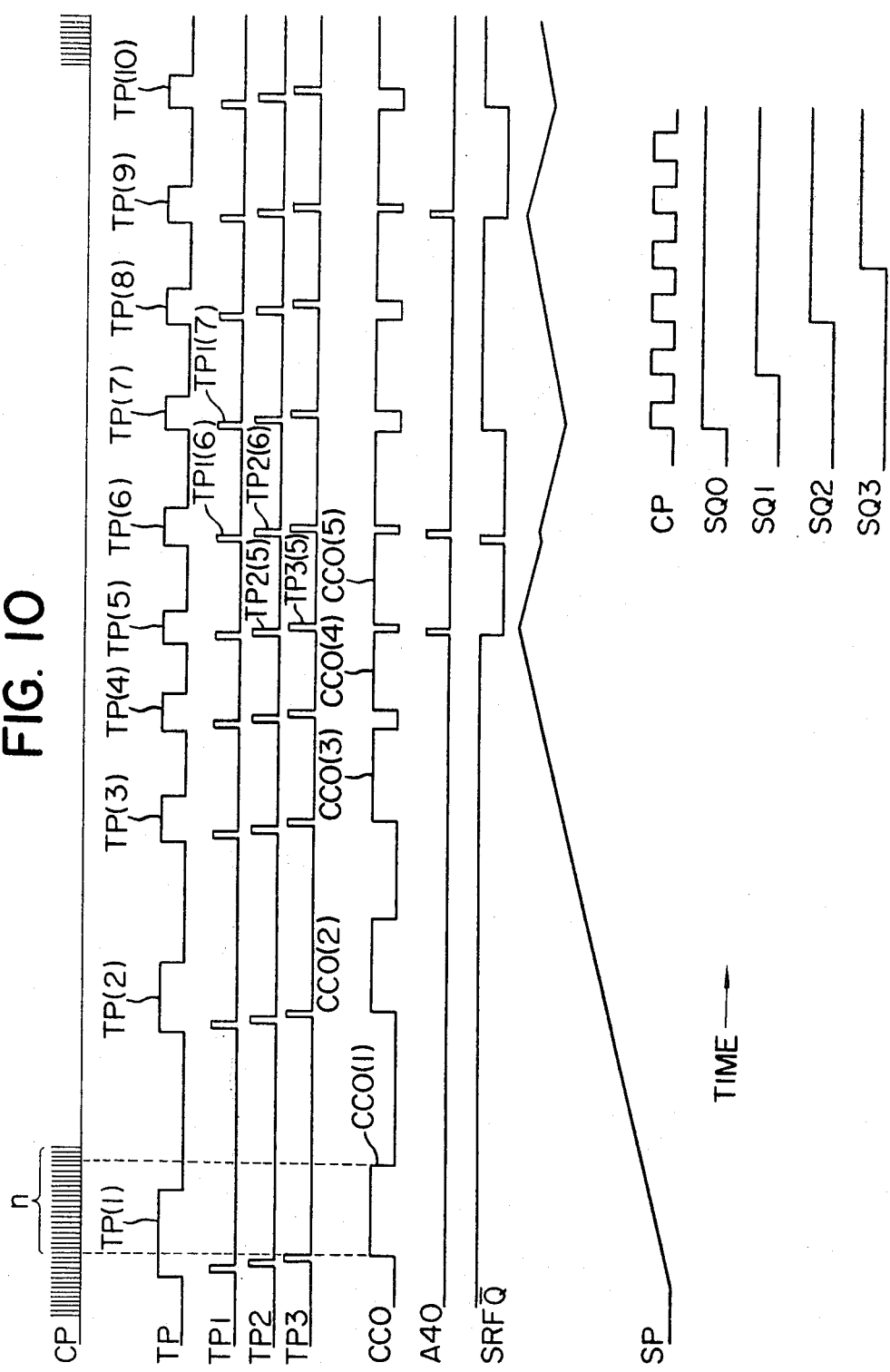
FIG. 10 is a waveform chart showing the operations of the speed control unit.

A speed control circuit SC for the carriage shown in FIG. 4A is detailedly shown in FIG. 9 with a corresponding timing chart shown in FIG. 10. In this circuit timing pulses TP are transmitted over a signal line lT from the amplifier AP in response to the optical signal detection by the light-emitting diode LE and phototransistor PT associated with the carriage movement along the split plate OS.

In response to timing pulses TP, the outputs Q0, Q1, Q2, Q3 of a 4-bit shift register SR are set in succession by the clock pulses CP from the clock generator CPG. Thus an AND gate A0 produces, through a signal line lT1, an output signal TP1 representing a logic product of the signals Q0 and Q1 inverted by an inverter i0, while an AND gate A1 produces over a signal line lT2 an output signal TP2 representing a logic product of the signals Q1 and Q2 inverted by an inverter i1, and an AND gate A2 develops through a signal line lT3 an output signal TP3 representing a logic product of the signals Q2 and Q3 inverted by an inverter i2, those signals TP1–TP3 being shown in FIG. 10. Signal TP1 supplied through the line lT1 resets a flip-flop SRF through an OR gate RF while the signal TP2 supplied through the line lT2 enables an AND gate A4 during the continuation thereof.

Also the signal TP3 supplied through the line lT3 sets the flip-flop FCP at the trailing end thereof the shift a signal line lnR to the high-level state, and causes an AND gate A3 to produce a high-level signal through an inverter ir thereby allowing entry of the clock pulses CP through a line lCP into a counter CCH.

Counter CCH is reset through the gate A3 in response to the "0" level state of the line l2 for the determined period at the start of the printing operation, while the flip-flop FCP is reset through the gate A5 and thus maintains the line lnR at "0" level thereby continuing the resetting of the counter CCH. Also it maintains the operative state until it is reset through a NAND gate ND at the completion of the counting by the counter CCH, when all the outputs Q0–Qn of the counter assume their high-level state. Thus, upon setting of the flip-flop FCP by the signal TP3, the counter CCH initiates the counting up to a number n, and upon completion of the counting the NAND gate ND develops a zero-level signal to reset the flip-flop FCP, thus also resetting the counter CCH.

Also the flip-flop SRF is reset through the line l2, an inverter i3 and an OR gate RF, thus maintaining AND gates AF, AB in their enabled state. Now the operations of this circuit will be explained while making reference to FIGS. 9 and 10. In response to a received input timing pulse TP(1) there are generated pulse signals TP1, TP2 and TP3, and upon setting of the flip-flop FCP by signal TP3, the counter CCH receives and counts the clock pulses CP with corresponding outputs to the terminals Q0–Qn. During the counting up to a number n, an OR gate ORO supplies a "1" level signal to the AND gate A4 through a signal line CCO.

Gate A4 also receives, through the signal line lT2, the signal TP2 generated in response to the timing signal TP, of which the timing and duration are related with the carriage speed. Consequently, in the case of a low carriage speed as represented by the signal TP(1) shown in FIG. 10, the signal TP2 is not produced to maintain the gate A4 disabled during the counting operation of the counter CCH, so that the flip-flop SRF remains in its reset state achieved, through the OR gate RF, by the signal TP1 produced prior to signal TP2. The carriage drive through the coil C is therefore continued as the states of the gates AF, AB are not affected in this state.

Also in response to the signals TP(2), TP(3) and TP(4) the AND gate A4 does not produce a logic product of the counter output signal CCO and the signal TP2 as in the case of signal TP(1) so that the coil drive undergoes no change, but the interval between the timing pulses is gradually shortened as the result of gradual speed increase of the carriage. Thus, in response to the signal TP(5), the gate A4 produces a logic product of the signal TP2(5) and the signal CCO(4) supplied from the counter CCH through the gate ORO, thus shifting the signal line A40 to "1" level and setting the flip-flop SRF.

In response to the setting the output $\overline{Q}$ thereof is shifted from "1" to "0" to disable the gates AF and AB, thus shifting the signal lines FM and FB to "0" and terminating the coil drive by the driver circuit MD. After the termination of the coil drive, the carriage still continues advancing by inertia, however with a gradually decreasing speed because of the friction. The counter CCH is reset by the signal TP3(5) inverted by the inverter ir, and initiates the counting operation again at the trailing end of the signal. Then, in response to the succeeding timing pulse TP(6), the flip-flop SRF is reset by the signal TP1(6) supplied through the gate RF, whereby the output $\overline{Q}$ is shifted to its high-level state to enable the gates AF, AB thereby restarting the coil drive.

Although the carriage speed id reduced within a period from the signal TP2(5) to the signal TP1(6), but this speed is still high at the pulse TP(6) shown in FIG. 10. For this reason the gate A4 again develops the logic product of the signal TP2(6) and the signal CCO(6) from the counter CCH to set the flip-flop SRF, thereby disabling the gates AF, AB and interrupting the coil drive until the receipt of the signal TP1(7) supplied in response to the succeeding pulse TP(7).

Then the flip-flop SRF is reset through the gate RF by the signal TP1(7) in response to the succeeding timing pulse TP(7), thereby energizing the gates AF, AB to restart the coil drive.

Thereafter the coil C is driven in a similar manner in response to a logic product of the signal TP2 and the counter output signal CCO, and the coil drive is not interrupted in response to the pulses TP(7) and TP(8) but to the pulse TP(9) thereby performing the speed control on the carriage CA based on the clock pulse counting by the counter CCH.

However, in the reciprocating motion of the carriage in the foregoing drive system, if the carriage speed is excessively high at the directional change of the carriage, there will be required a considerably long time for the directional change as the reversing drive does not operate until the carriage speed is reduced to a determined value since the motor drive is interrupted by the signal at the directional change.

Also there exists a fluctuation in the carriage position because of the slight gap between the carriage CA and the guide member Y2, and such fluctuation tends to appear particularly in carriage reversing from the backward to the forward direction or from the forward to the backward direction.

Such positional fluctuation has no undesirable effect in the home position area but may result in the generation of a short timing pulse TP at the moment of start of backward movement from the temporarily stopped state if the light detecting portion of the carriage CA is positioned at the boundary of a slit and an opaque portion on the slip plate (for example KS in FIG. 4B (c)) at such moment. Thus the speed control unit, if in operation at such moment, erroneously identifies a high carriage speed in response to such a short timing pulse to terminate the motor drive, even though the carriage speed is in fact close to zero. As a result, carriage CA will completely stop at the direction change in the course of the printing operation.

Another feature of the present invention is to interrupt the speed control during the aforementioned slit counting operation at the carriage direction change, thereby preventing the excessively long direction change as explained above and the danger of undesirable carriage stop.

Now a control system featuring the above-mentioned advantages will be discussed in connection with FIG. 11, and the operations thereof will be explained with reference to FIG. 12.

In the following embodiment it is assumed that the carriage has only one ink jet nozzle for the purpose of simplicity, but it will be evident that this control system is also applicable to printing heads having seven ink jet nozzles or other printing head types. Referring to FIG. 11, the print character storage CM stores information to be printed which is supplied from the keyboard KB through the operational unit ALT. In response to the print command signal PO as shown in FIG. 6A, the flip-flop F1 is set to render the control unit CC to its print operation mode through the signal line l1, whereby the signal line l2 is maintained at "0" level for a determined period to reset the flip-flop F1, to clear the print counter PC, a line counter 7C, the backward counter BC1 and timing pulse separating circuit TB through the gate AR, and to reset the flip-flop F2 through the inverter iB.

Simultaneously the one-shot multivibrator OS is also activated, but the counter SC is not affected since the gate ST is disabled under the condition lR=0. However, the gate BG is energized through the inverter iR. After the resetting and clearing operations, the control unit CC produces a high-level signal on the signal line l4 to enable the gate AC, and identifies, through the signal line l5, the output signal from the coincidence circuit CO comparing the contents of the print counter PC and the print position storage register PR (hereinafter referred simply to as print register). In the case of no coincidence the control unit CC maintains the signal lines lF and lB respectively at "1" and "0" to drive the coil C through the driver circuit MD thereby causing the forward advancement of the carriage CA.

For example, if the print counter PC and the print register PR respectively have contents "0" and "n", the coincidence circuit CO produces an output signal indicating the absence of coincidence, in response to which the control unit CC performs the above-explained drive.

As a result of the forward advancement of the carriage, the detecting circuits LE, PT travel along the optical slit plate OS to generate timing pulses TP amplified by the amplifier AP. Timing pulses TP are supplied through the gate AT enabled under the condition lF=1 and divided, by the timing pulse separating circuit TB, into 5-pulse signal groups TD1–TDn for character printing as shown in FIG. 6B, and signal group TD1 is at first supplied to a parallel-serial converter circuit PSC and to a gate SD.

The number of characters to be printed in a line is stored in advance in the print register PR, and the character digit to be printed is counted by the print position counter PC, of which the output signal is received by the decoder DC for selecting the content of the print character storage CM.

In response to thus selected content and also to the control by the line counter 7C, the character generator CG generates 5-bit print signals.

Those 5-bit print signals are supplied to the parallel-serial converter circuit PSC, of which the output signal is supplied, through the gate SD to be enabled by the signal on line l9 only at the high-level state of the signal TD1 and further through a signal line l10, to the pulse duration setting circuit DS, which produces pulses of a determined duration for driving the piezo driver circuit PD, thereby activating the piezoelectric device PZ to cause ink droplet emission and thus achieve the printing.

Upon completion of the printing, in the above explained manner, of 5 dots constituting the first of seven lines in the 5×7 dot matrix of the first printing position in a print line, the control unit CC detects the completion through a signal line l11 and generates a signal through a line l7 to increment the print position counter PC. Then the coincidence CO compares the contents of the print register PR and of the print counter PC and transmits the result of the comparison to the signal line l5 through the gate AC enabled by the signal line l4, and, in the case of no coincidence the control unit CC performs the printing of a character stored in the print character storage CM corresponding to the incremented content of the print counter PC and in response to the 5-pulse signal TD2 from the separating circuit TB.

The above-explained procedure of the increment of the print position counter, memory readout and signal entry into the parallel-serial converter circuit can be done sufficiently prior to the succeeding 5-pulse signal as the clock rate of the circuit is sufficiently higher than the frequency of the timing pulses. In this manner selective printing of each 5 dots constituting the first line in the print line is executed in succession in response to the signals TD3, TD4, . . . Tdn. When the coincidence circuit CO identifies the coincidence of the contents of the print position counter PC and the print register PR and transmits the coincidence signal through the line l5 and the gate AC enabled by the condition l4=1, the control unit CC maintains the signal line l8 at "1" level for a determined period to drive the drive circuit PFD for performing the paper feeding, to clear the backward counter BC1 through the gate AR, to reset the flip-flop F2 and to increment the line counter 7C. In this state the control unit CC identifies that the 7th printing line is not yet reached by the "0" level state of the signal line l12 of a gate AL providing a logic product of the output signals from the line counter 7C.

Also the control unit CC shifts the signal lines lF and lB respectively "0" and "1" thereby causing backward movement of the carriage, during which the timing pulse TP are introduced into the backward counter BC through the signal line lC since the gate BAG is enabled through the inverter iR because of the state lR=0 and the gate BG is also enabled because of the condition lB=1 maintaining the output signal $\overline{Q}$ of the flip-flop F2 at the "1" level. As explained in the foregoing, the backward counter BC1 counts the timing pulses generated until the completion of direction change to the backward advancement. Upon completion of the timing pulse counting, the flip-flop F2 is set by the signal on line lB.

In response to the setting the flip-flop F2 enables a gate BFA to allow the clock pulses to be transferred from the clock generator CPG to the backward counter 2 BC2 through a signal line lCP. Counter 2 BC2, receiving a signal $\overline{TP}$ at the clear terminal thereof from the inverter iT through gate BFA, operates only during the high-level state of the signal $\overline{TP}$, thus counting the clock pulses only when the carriage is located at an opaque portion of the slit plate OS and identifying, by a determined full count, the advancing time in an opaque portion between the slits SS from that in the opaque portion in the home position area. As discussed in the foregoing, the advancing time in the opaque portion in the home position area is for example selected five times as long as the displacing time in an opaque portion between the slits SS. Thus the counter 2 BC2 generates no output signal on the signal line lBC as it is repeatedly cleared by the signal $\overline{TP}$=0 corresponding to the slits SS, and provides output signal through the gate BAG to the control unit CC only when the carriage CA reaches the home position area. In response to the output signal the control unit CC identifies the carriage position outside the slit area and shifts the signal line lB to "0" thereby terminating the carriage drive in the backward direction. The carriage continues the advancement by inertia even after the termination but is brought to a temporary stop at the position HO shown in FIG. 5 by the succeeding forward drive for the printing operation for the next line to be explained in the following. During the backward movement the printing operation is not effected since the timing pulse separating circuit TB does not receive the timing pulses TP as the gate AT is disabled under the condition lF=0.

The control unit CC executes the printing of the succeeding line since it is already identified, through the signal line l12, that the printing of the 7th line in the 5×7 dot matrices is not yet completed.

In this state the line counter 7C is incremented to indicate the second line in the character generator CG, and the control unit CC maintains the lines lF and lB respectively at "1" and "0" to activate the driver circuit MD through the control circuit SC, to enable the gate AT and to disable the gate BG. Along with the forward carriage movement the detecting elements LE, PT travel along the slit plate OS to generate timing pulses TP, which are divided by the separating circuit TB into 5-pulse signal groups TDl–TDn. Thus, as explained in the foregoing, the character generator CG generates the data of the second line in the 5×7 dot matrix of the first digit character selected from the print character storage CM in response to the output signal from the print position counter PC supplied through the decoder DC and also under the control of the line counter 7C. Such data are transmitted in succession through the parallel-serial converting circuit PSC in response to the 5-pulse signal from the separating circuit TB to the pulse duration setting circuit DS, which in turn drives the driver circuit PD for determined durations to effect the printing of the second line in the 5×7 dot matrix constituting the first digit character.

Thereafter the printing operation is effected for the second line of the 5×7 dot matrices in the same manner as in the printing of the first line.

Upon detection by the coincidence circuit CO of the completion of the printing of the second line, the control unit CC executes the paper feeding through the signal line 18, clears the print position counter PC, timing pulse separating circuit TB and backward counter CB1, resets the flip-flop F2 and increments the line counter 7C. In this state the control unit CC identifies, through the "0" level state of the signal line 112 from the gate AL, that the printing of the 7th line of the 5×7 dot marices is not yet completed. Then the signal lines 1F and 1B are respectively shifted to "0" and "1" to reverse the carriage, and the timing pulses TP are introduced through the gate BG to the backward counter BC during the backward movement of the carriage for detecting the arrival at the home position through comparison of the advancing time in the opaque portion between the slits SS and in the opaque portion in the home position area. Upon the detection the coil drive is terminated to stop the carriage at the position HP outside the slit area.

Thereafter continued is the printing of a succeeding line indicated by a count incremented in line counter 7C.

Thus the printing of the 3rd, 4th, ... lines are conducted in a similar manner, and, after a completion of the printing of 7th line, the control unit CC executes the paper feeding, clears the print position counter PC, timing pulse separating circuit TB and backward counter BC, resets the flip-flop F2 and increments the line counter 7C.

In this state the control unit CC identifies the completion of the printing of the 7th line from the "1" level signal supplied from the gate AL through the signal line 112, and effects three additional paper feeding operations by the paper feed driver PFD through the signal line 18. Also the control unit CC identifies the state of the signal line 11 of the flip-flop F1 indicating the presence or absence of the succeeding print command signals. In case 11=1 indicating the presence of the print command signals for the next print line, the control unit CC shifts the signal lines 1F and 1B respectively to "0" and "1" to return the carriage to the home position HP outside the slit area in the same manner as in the backward advancement in each line in the 5×7 dot matrix, under the control of comparison of advancing time in the opaque portion to be conducted by the backward counter 2BC2 controlled in turn by the output signals from the backward counter BC1.

Then the control unit CC stores the information of the succeeding print line and the number of positions respectively in the print character memory CM and the print register PR, and initiates the printing of a succeeding print line by maintaining the signal line 12 at "0" level for a determined period in the foregoing manner thereby to reset the flip-flop F1, to clear the print position counter PC, line counter 7C, counter BC and timing pulse separating circuit TB through the gate AR and to reset the flip-flop F2. The one-shot multivibrator OS is again activated but the counter SSC is not affected since the gate ST is de-energized under the condition IR=0. Also the gate BAG remains enabled.

Then, in a similar manner to that of the printing of the preceding print line, the coincidence circuit CO compares the contents of the print counter PC and the print register PR and transmits the result of the comparison through the gate AC enabled under the condition 14=1 to the signal line 15. Upon identification of no coincidence the control unit CC effects the printing operation in the foregoing manner and detects the completion of the printing of a dot line or a print line by means of the output line 112 from the gate AL indicating the output state from the line counter 7C.

In the case of continued printing, the printing operation is thereafter executed by returning the carriage to home position HP.

Also in case the control unit CC identifies the state 11=0 indicating the absence of succeeding print command signal, the carriage CA is returned to a stop position HO, outside the slit area, which is the same as in the turning on of the power supply.

The stop position HP of the carriage at the continued printing is selected different from and in front of the stop position HO at the end of the printing operation in order to reduce the printing time by shortening the advancing time of the carriage outside the slit area for printing and immediately initiating the succeeding forward movement from stop position HP.

It is also possible to always return the carriage to the position HP without using the position HO, but a separate stop position HO is useful in providing the head protecting means KP for the fixation, capping and cleaning of the printing head and in effecting the head recovery when the printing head is not in use. At the returning transfer of the carriage CA to the stop position HO, the signal line 12 is maintained at "0" level for a determined period in a similar manner to that of the turning on of the power supply to reset the flip-flop F1, to clear the print position counter PC, line counter 7C, timing pulse separating circuit TB and counter BC through the gate AR, to reset the flip-flop F2 and to start the one-shot multivibrator OS. Then the signal line IR is shifted to "1" level to enable the gate ST thereby allowing the entry of the output pulse from the generator CPG to the counter SSC only when $\overline{TP}=1$. In this state the gate BAG is disabled so that the output from the backward counter 2BC2 is not transmitted to the control unit CC.

Then the signal lines 1F and 1B are respectively maintained at "0" and "1" to cause backward movement of the carriage through the coil C, and the counter SSC repeats counting of the pulses from the generator CPG and resetting. After the carriage is transferred to the stop position HO shown in FIG. 5, the counter SSC generates an output signal on the signal line 1S upon completion of the pulse counting, whereby the control unit CC identifies the arrival of the carriage at the position HO and shifts the signal line 1B to "0" thereby terminating the coil drive to stop the carriage at position HO. Then the signal line IR is shifted to "0" to open the gate ST and also to enable the gate BAG through the inverter iR thereby terminating the printing operation.

As explained in the foregoing, the stop position HP represents the position of temporary stop of the carriage CA after inertial backward movement, the temporary stop being achieved by the succeeding forward drive for the printing of a next print or dot line in the continuous printing of 5×7 dot matrices.

Figure 11:
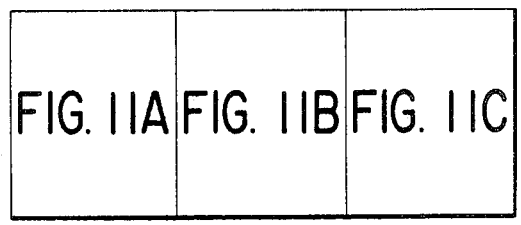
FIG. 11, 11A, 11B, 11C are a schematic block diagram of the control unit of the embodiment.
Figure 11C:
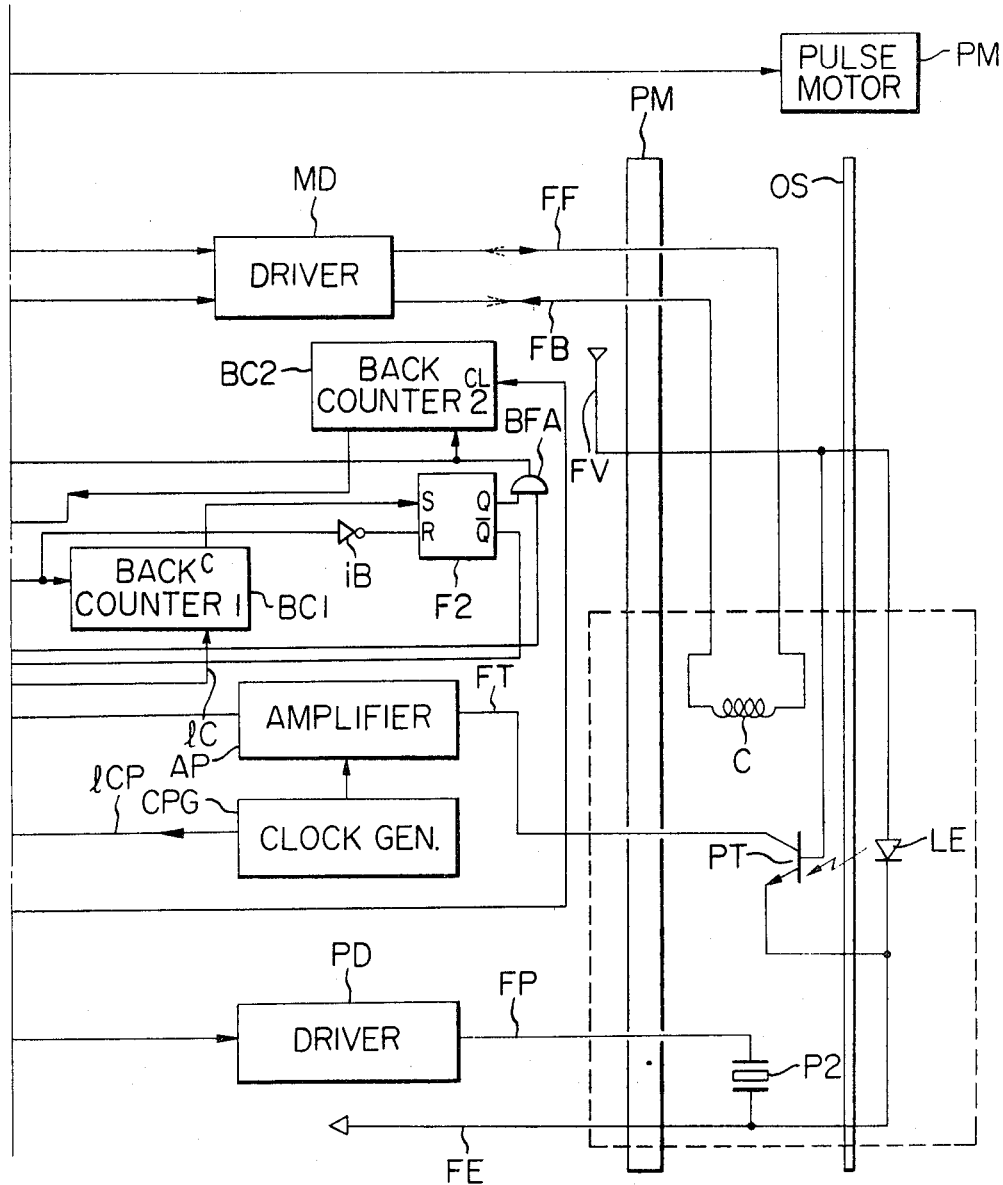
Figure 11A:
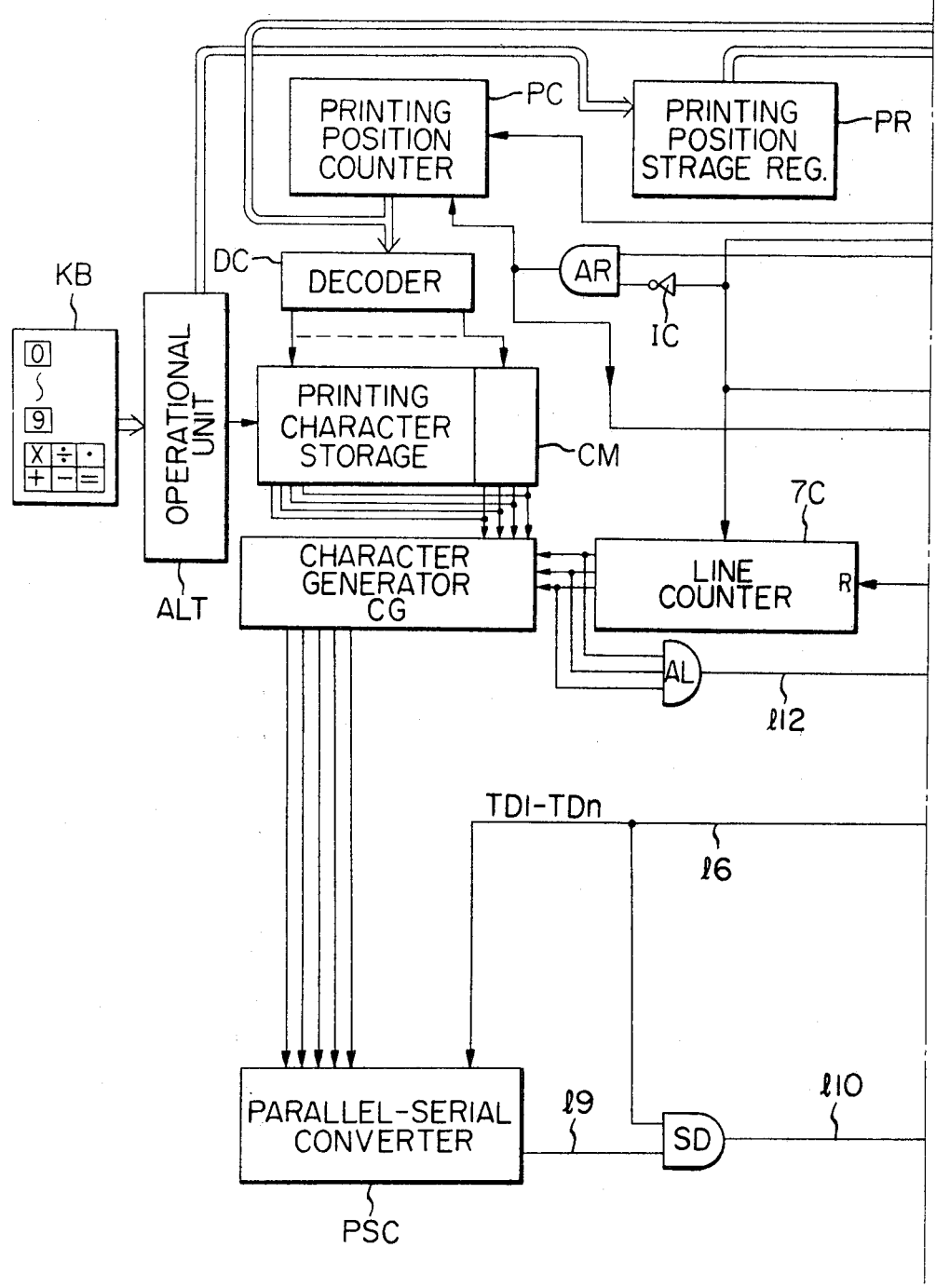
Figure 11B:
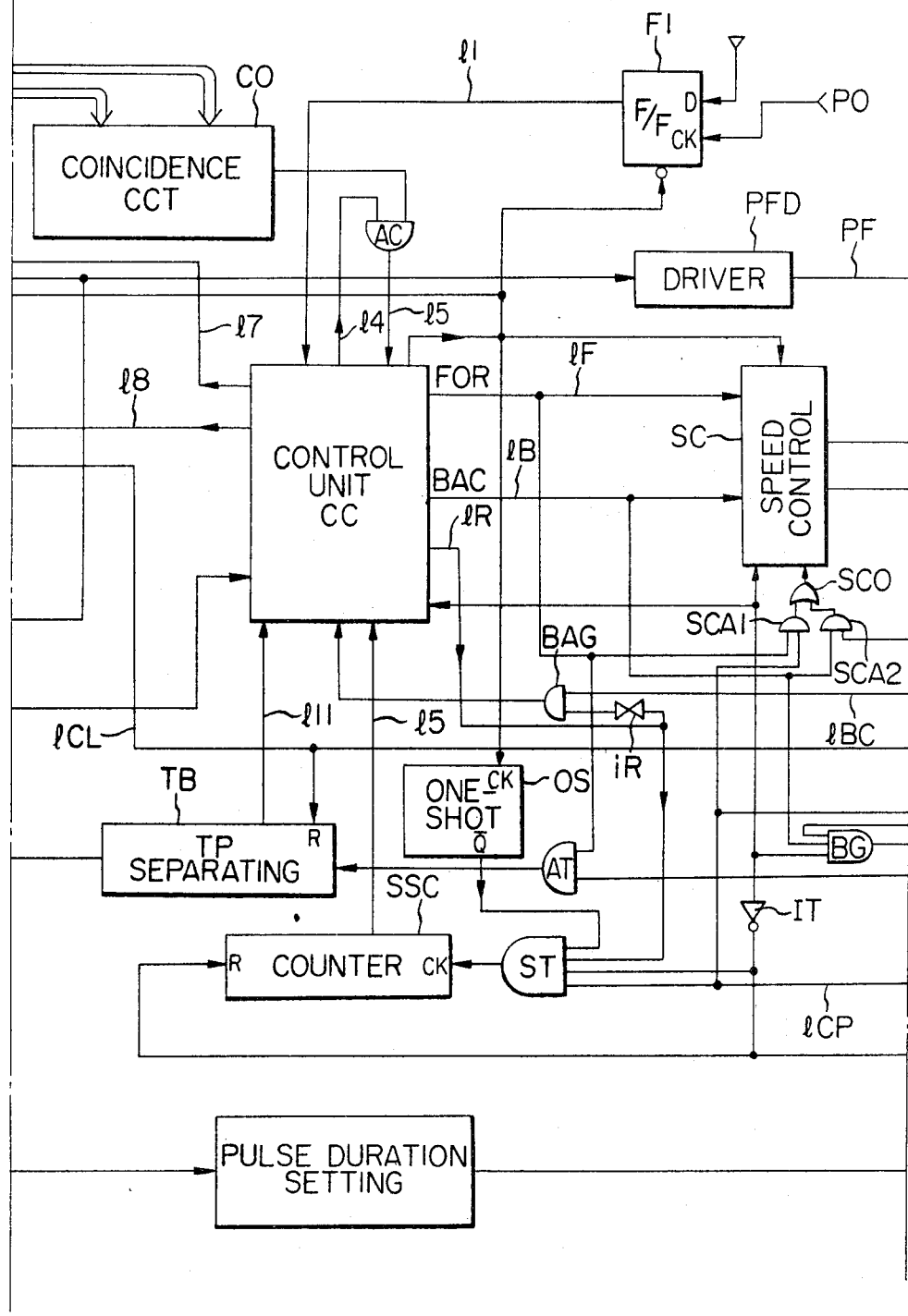
Figure 12B:
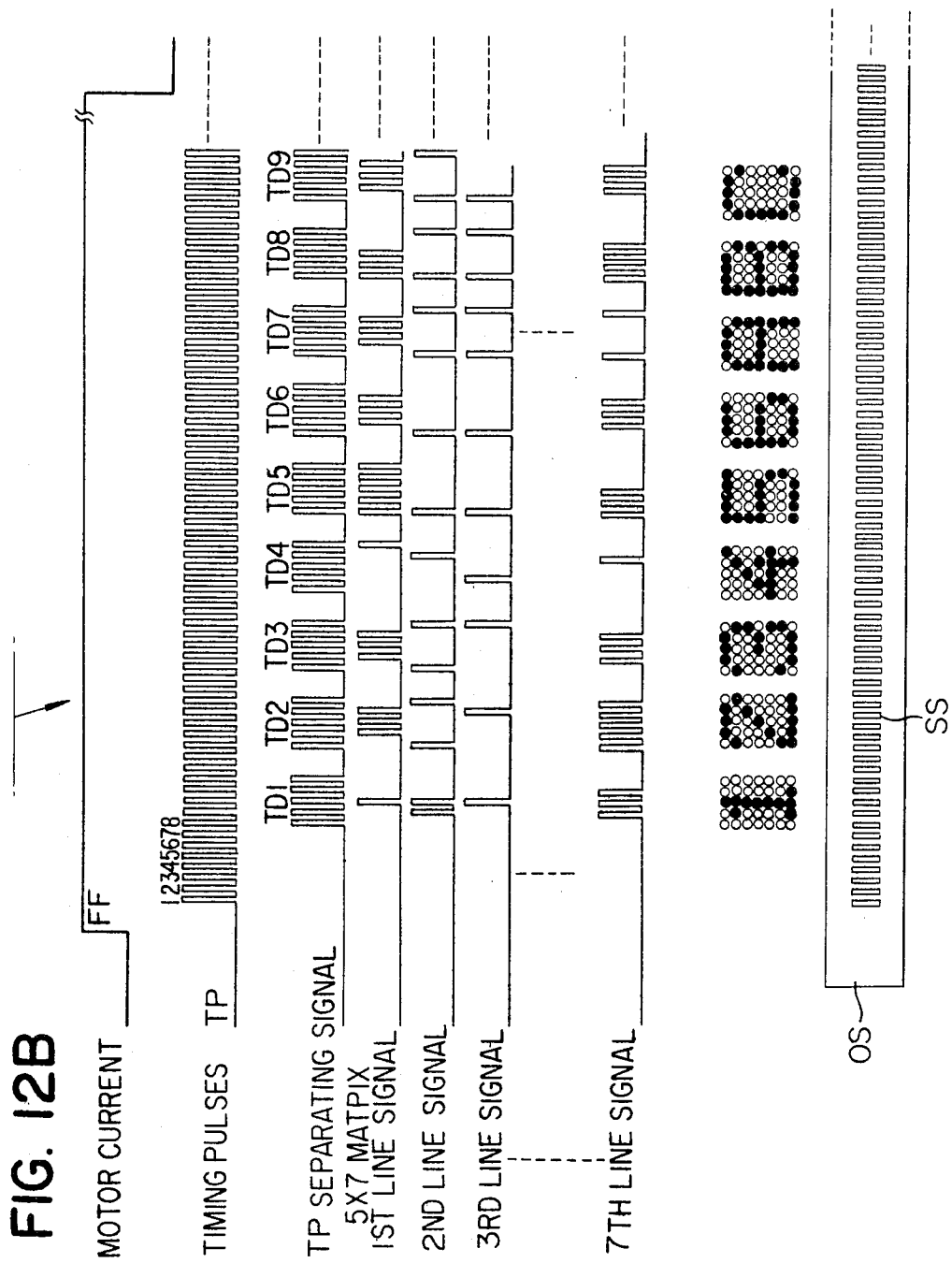
Figure 13:
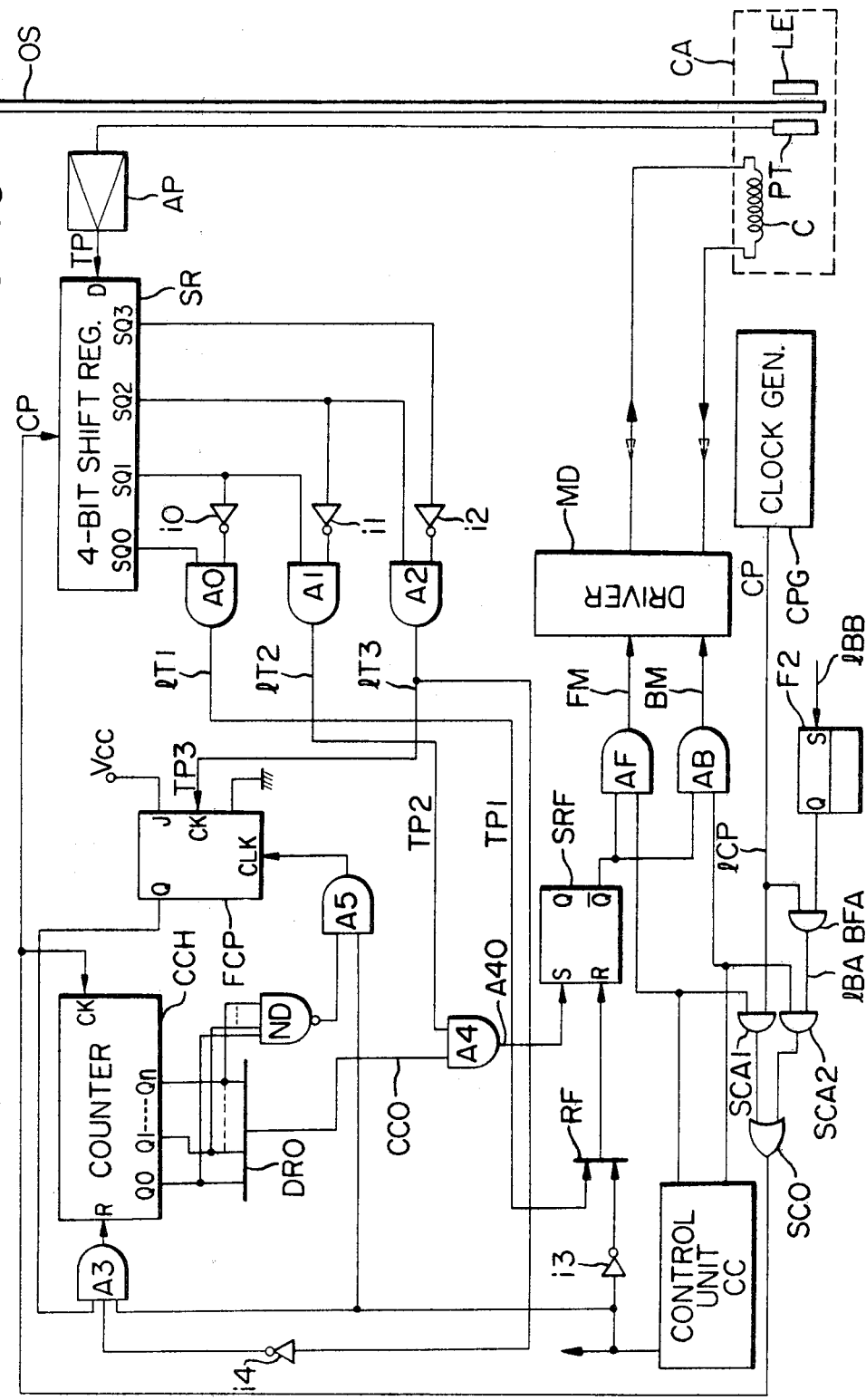
FIG. 13 is a schematic circuit diagram of the speed control unit thereof.

SC shown in FIG. 11 is a speed control in the present embodiment which is responsive to the timing pulses TP generated by means of the slit plate OS and also to the clock pulses supplied from the clock generator CPG over the signal line 1CP.

The clock pulses are supplied to speed control unit SC through AND gates SCA1, SCA2 and an OR gate SCO.

AND gate SCA1 controlled by the signal on line IF is enabled when IF=1, i.e. during the forward drive of the carriage CA to enter the clock pulses through OR gate SCO.

AND gate SCA2 controlled by the signal on line IB is enabled when IB=1, i.e. during the backward drive of the carriage CA. The clock pulses from the signal line ICP are introduced into the speed control SC through an output signal line IBA from the gate BFA controlled by the flip-flop F2 and through the OR gate SCO. As explained in the foregoing, flip-flop F2 is set in the backward carriage drive by IBB=1 from the backward counter BC counting the number of slits in the direction change, so that the gate BFA remains disabled to prohibit the output of clock pulses through the line ICP even if the AND gate SCA2 is energized under the condition IB=1 in the backward advancement. Also the AND gate SCA1 prohibits the entry of clock pulses because of the condition IF=0 during the backward transfer, so that the speed control SC does not operate because of the absence of clock pulse entry after the counting of a determined number of slits by the backward counter BC and until the setting of the flip-flop F2 by IB=1.

In this manner it is rendered possible to prevent an excessively long time or other unexpected circumstances as explained in the foregoing at the direction change of the carriage.

As discussed in the foregoing, the present invention is effective, in the printing operation by the reciprocating motion of the carriage according to the number of digits to be printed in a printer utilizing a linear motor and having an optical slit plate and a light detecting circuit, in enabling to reduce the home position detecting time and thus to reduce the entire printing time by comparing the movement time of the carriage in an opaque portion in the constant or quasi-constant speed state with the movement time in the opaque portion in the home position area, instead of comparison with the maximum movement time in an opaque portion at the direction change of the carriage. The present invention is also advantageous in reducing the time required for the direction change of the carriage and preventing the undesirable carriage stopping resulting from a play between the carriage CA and the guide member Y2, by means of interrupting the speed control at the direction change of the carriage.

The present invention is also applicable to a slit plate in which the opaque portions and translucent portions are inverted or which is provided with a large translucent portion at the home position area for generating a home position signal.

What I claim is:

1. A high speed recording apparatus comprising:
    linear motor means;
    a carriage driven reciprocally by said linear motor means and having a printing head thereon;
    a graduation plate connected to said linear motor means and positioned along the reciprocal movement path of said carriage;
    a graduation detecting means provided on said carriage for generating signals indicative of the position and advancing speed of said carriage along said graduation plate; and
    control means for controlling the movement of said carriage, which control means includes means for sensing the position and the advancing speed of said carriage from the signals generated by said graduation detecting means, means for regulating the advancing speed in accordance with the sensing means when said carriage is advanced in a predetermined direction, and means for disabling the regulating means when the advancement of said carriage is in a direction other than the predetermined direction.

2. Recording apparatus according to claim 1, wherein said printing head comprises ink jet nozzles.

3. Recording apparatus according to claim 1, wherein said linear motor means comprises a permanent magnet.

4. A linear motor control system for a high speed recording apparatus comprising:
    linear motor means;
    a carriage moved by said linear motor means;
    control means for controlling the linear motor means, thereby regulating the advancing speed of said carriage in a predetermined direction; and
    means for disabling said control means when the movement of said carriage is in a direction other than the predetermined direction.

5. A linear motor control system according to claim 4, wherein said linear motor means comprises a permanent magnet and a moving coil which is mounted on said carriage.

6. A linear motor control system according to claim 4, wherein said carriage is provided with a printing head and is switched in an advancing direction according to the length of data to be printed.

* * * * *

UNITED STATES PATENT AND TRADEMARK OFFICE
CERTIFICATE OF CORRECTION

PATENT NO. : 4,415,911   Page 1 of 2
DATED : November 14, 1983
INVENTOR(S) : SHIGEMITSU TAZAKI It is certified that error appears in the above-identified patent and that said Letters Patent is hereby corrected as shown below:

Column 1, line 11, "highspeed" should read --high speed--;
         line 29, "Fiq" should read --Figs--;
         line 29, "4'''" should read -- 4A''' --.
         line 46, "Fig" should read -- Figs --.

Column 2, line 17, "lightemitting" should read --light-emitting--.

Column 3, line 10, "response of" should read --response to--.

Column 5, line 31, "faciliating" should read --facilitating--.

Column 7, line 23, "generators" should read --generator--;
         line 46, before --third-- insert "the".

Column 8, line 30, "under" should read --upon--.

Column 10, line 30, "the shift" should read --to shift--.

Column 11, line 20, before --and-- second occurrence, insert "level"

Column 11, line 33, "id" should read -- is --.

UNITED STATES PATENT AND TRADEMARK OFFICE
CERTIFICATE OF CORRECTION

PATENT NO. : 4,415,911  
DATED : November 15, 1983  
INVENTOR(S) : SHIGEMITSU TAZAKI Page 2 of 2

It is certified that error appears in the above-identified patent and that said Letters Patent is hereby corrected as shown below:

```
Column 13, line 28, after --coincidence-- insert "circuit";
           line 46, "Tdn" should read --TDn--;
           line 63, "are" should read --is--.

Column 15, line 10, "marices" should read --matrices--;
           line 24, "are" should read --is--;
           line 26, after "of" insert --the--.
```

Signed and Sealed this

Nineteenth Day of June 1984

[SEAL]

Attest:

*Attesting Officer*

GERALD J. MOSSINGHOFF

*Commissioner of Patents and Trademarks*